US012440446B2

(12) United States Patent
Harris et al.

(10) Patent No.: US 12,440,446 B2
(45) Date of Patent: Oct. 14, 2025

(54) POLYMERIC DELIVERY SYSTEMS

(71) Applicant: THE SECANT GROUP, LLC, Telford, PA (US)

(72) Inventors: Jeremy J. Harris, Doylestown, PA (US); Scott Radzinski, Gilbertsville, PA (US); Brian Ginn, Harleysville, PA (US); Peter D. Gabriele, Frisco, TX (US); Benjamin Roadarmel, Quakertown, PA (US)

(73) Assignee: THE SECANT GROUP, LLC, Telford, PA (US)

( * ) Notice: Subject to any disclaimer, the term of this patent is extended or adjusted under 35 U.S.C. 154(b) by 0 days.

(21) Appl. No.: 18/049,519

(22) Filed: Oct. 25, 2022

(65) Prior Publication Data

US 2023/0125499 A1    Apr. 27, 2023

Related U.S. Application Data

(60) Provisional application No. 63/271,283, filed on Oct. 25, 2021, provisional application No. 63/271,275, filed on Oct. 25, 2021.

(51) Int. Cl.
| | |
|---|---|
| A61K 9/51 | (2006.01) |
| A61K 9/16 | (2006.01) |
| A61K 9/50 | (2006.01) |
| A61K 31/7105 | (2006.01) |
| A61K 31/711 | (2006.01) |
| A61K 47/34 | (2017.01) |
| B82Y 5/00 | (2011.01) |
| C08F 120/60 | (2006.01) |
| A61K 48/00 | (2006.01) |

(52) U.S. Cl.
CPC .......... *A61K 9/1647* (2013.01); *A61K 9/5026* (2013.01); *A61K 9/5146* (2013.01); *A61K 31/7105* (2013.01); *A61K 31/711* (2013.01); *A61K 47/34* (2013.01); *B82Y 5/00* (2013.01); *C08F 120/60* (2013.01); *A61K 48/00* (2013.01)

(58) Field of Classification Search
CPC .. A61K 9/1647; A61K 9/5026; A61K 9/5146; A61K 31/7105; A61K 31/711; A61K 47/34; A61K 48/00; A61K 9/0019; A61K 47/593; B82Y 5/00; C08F 120/60; C08G 63/16; C08G 63/672; C08G 63/6856
See application file for complete search history.

(56) References Cited

U.S. PATENT DOCUMENTS

| | | | |
|---|---|---|---|
| 6,890,560 B2 * | 5/2005 | Seo | C08G 63/00 424/490 |
| 9,359,472 B2 | 6/2016 | Nicholson et al. | |
| 10,619,162 B1 | 4/2020 | Rossi | |
| 2011/0256227 A1 * | 10/2011 | Mirosevich | A61K 31/7105 424/490 |
| 2019/0328677 A1 | 10/2019 | Kim et al. | |
| 2021/0220287 A1 | 7/2021 | Jamieson et al. | |
| 2021/0236645 A1 | 8/2021 | Li et al. | |
| 2021/0239347 A1 | 8/2021 | Wiens-Kind et al. | |

FOREIGN PATENT DOCUMENTS

| | | |
|---|---|---|
| JP | 2018145155 A | 9/2018 |
| WO | WO-2007001448 A2 * | 1/2007 ............. A61K 38/28 |
| WO | 2021023798 A1 | 2/2021 |

OTHER PUBLICATIONS

Louage et al. "Poly(glycerol sebacate) nanoparticles for encapsulation of hydrophobic anti-cancer drugs" Polym. Chem. 2017, 8, 5033-5038. (Year: 2017).*

Gaucher et al. "Block copolymer micelles: preparation, characterization and application in drug delivery" Journal of Controlled Release 2005, 109, 169-188. (Year: 2005).*

Chen et al. "Biodegradable Polymers for Gene-Delivery Applications", International Journal of Nanomedicine, 2020, 15, 2131-2150. (Year: 2020).*

Loh et al. "Poly(glycerol sebacate) biomaterial: synthesis and biomedical applications" J. Mater. Chem. B, 2015, 3, 7641-7652. (Year: 2015).*

Desai et al. "Self-assembled, ellipsoidal polymeric nanoparticles for intracellular deliver of therapeutics" Journal of Biomedical Materials Research A 2018, 106A, 2048-2058. (Year: 2018).*

Zugates et al. "Gene Delivery Properties of End-Modified Poly(B-amino ester)s" Bioconjugate Chem. 2007, 18, 1887-1896) (Year: 2007).*

Altman et al., "From Krebs to Clinic: Glutamine Metabolism to Cancer Therapy", Nat. Rev. Cancer, vol. 16, pp. 619-634 (2016).

Hou et al., "Lipid nanoparticles for mRNA delivery", Nature Review Materials, vol. 6, pp. 1078-1094 (2021).

Mitchell et al., "Engineering precision nanoparticles for drug delivery", Nature Reviews: Drug Discovery, vol. 20, pp. 101-124, (2021).

Yang et al., "Glutamine Oxidation Maintains the TCA Cycle and Cell Survival during Impaired Mitochondrial Pyruvate Transport", Molecular Cell, vol. 56, pp. 414-424 (2014).

(Continued)

*Primary Examiner* — Bethany P Barham
*Assistant Examiner* — Judith Marie Kamm
(74) *Attorney, Agent, or Firm* — McNees Wallace & Nurick LLC

(57) ABSTRACT

A polymeric delivery system delivers a biologic to cells. In some embodiments, the polymeric delivery system includes polyplexes. Each polyplex includes at least one charged polymer and at least one biologic. The at least one charged polymer includes a polyester copolymer of a polyol and a polycarboxylic acid modified with at least one charged moiety having an opposite charge from a net charge of the at least one biologic. In other embodiments, the polymeric delivery system includes self-assembled particles including a block copolymer and a biologic associated with the block copolymer. The block copolymer includes a first block of a polyester copolymer of a polyol and a polycarboxylic acid and a second block of a second monomer or a second polymer.

25 Claims, 9 Drawing Sheets

(56) References Cited

OTHER PUBLICATIONS

Chen et al., "Biodegradable Polymers for Gene-Delivery Applications", International Journal of Nanomedicine, vol. 15, Mar. 1, 2020, pp. 2131-2150.

Desai et al., "Self-assembled, ellipsodal polymeric nanoparticles for intracellular delivery of therapeutics", Journal of Biomed. Materials Research Part A, vol. 106A, No. 7, Apr. 30, 2018, pp. 2048-2058.

Loh et al., "Poly(glycerol sebacate) biomaterial: synthesis and biomedical applications", Journal of Materials Chemistry B, vol. 3, No. 39, Jan. 1, 2015, pp. 7641-7652.

Louage et al., "Poly(glycerol Sebacate) nanoparticles for encapsulation of hydrophobic anti-cancer drugs", Polymer Chemistry, vol. 8, No. 34, Jan. 1, 2017, pp. 5033-5038.

Dueno et al., "Cesium Promoted O-Alkylation of Alcohols for the Efficient Ether Synthesis", Tetrahedron Letters, vol. 40, pp. 1843-1846 (1999).

Syga et al., "Albumin Incorporation in Polyethylenimine-DNA Polyplexes Influences Transfection Efficacy", Biomacromolecules, vol. 17, pp. 200-207 (2016).

Zhang et al., "Polymersomes in Nanomedicine—A Review", Current Nanoscience, vol. 13, pp. 124-129 (2019).

Wang et al., "Poly(Glycerol Sebacate) in Tissue Engineering and Regenerative Medicine", Material Matters, 13 pages, (2016).

Kamijo et al., "An Improved and Convenient Synthesis of Esters Using 1,1'-Carbonyldiimidazole and a Reactive Halide", Chem. Pharm. Bull., vol. 32, pp. 5044-5047, (1984).

\* cited by examiner

POLYMERIC DELIVERY SYSTEMS

CROSS-REFERENCE TO RELATED APPLICATIONS

This application claims priority to and the benefit of U.S. Provisional Application No. 63/271,275 and U.S. Provisional Application No. 63/271,283, both filed Oct. 25, 2021, which are hereby incorporated by reference in their entirety.

FIELD OF THE INVENTION

The present disclosure is generally directed to polymeric delivery systems. More specifically, the present disclosure is directed to polymeric delivery systems that deliver biologics to biological systems, where the polymer includes a polyester copolymer of a polyol and a polycarboxylic acid.

BACKGROUND OF THE INVENTION

Efficient, targeted delivery of nucleic acids is a goal in numerous biological fields. Cationic and lipid compounds have been used to deliver nucleic acids to biological cells, such as, for example, to transfect cells in vitro for research. Being highly negatively charged, nucleic acids do not easily enter cells across the cell membrane nor can they easily escape from endosomal compartments formed during cellular uptake. Nucleic acids are also cleaved by nucleases that may be present both extracellularly and intracellularly.

Polyplexes, and more specifically cationic polymer/therapeutic gene complexes, have shown promise for the efficient delivery of biologically active compounds to cells, including mammalian cells. For example, cationic polymers mixed with plasmid deoxyribonucleic acid (pDNA) forms a binary polyelectrolyte complex that can be taken up by cells, but these formulations can have a short circulation time in vivo and can become cytotoxic at higher concentrations, limiting their use.

Certain cationic polymers are very efficient at condensing nucleic acids and protecting them from degradation by nucleases, but cationic polymers can also be toxic to cells, depending on the total net positive charge present and the characteristics of the polymer, such as, for example, its molecular weight or degree of branching. Cationic polyamines, such as, for example, polyethylenimine (PEI), poly(L-lysine), polyamidoamines, chitosan, polyaminoesters, and polyacrylates have been evaluated as potential nucleic acid delivery vehicles.

Nanomedicine and nanoparticle-based targeted delivery of biologic payloads for therapeutic administration has had a checkered success record over the past two decades. Reasons for the lack of success may include a lack of understanding of the reticuloendothelial and immune systems that keep the human body free of foreign materials at the submicron level, a limited understanding of monocyte and macrophage differentiation, and a poor understanding of material surface and cell interaction. For instance, only about 0.7% of injected nanoparticle doses may reach the target tumor (see, for example, Mitchell et al., "Engineering precision nanoparticles for drug delivery", Nature Reviews: Drug Discovery, Vol. 20, pp. 101-124 (2021)). During the last decade or so, biomedical engineers and scientists may have been unaware of the influence of the immune system on parenteral administration, whether subcutaneous, intravenous, intramuscular, or intrathecal, and this lack of awareness may have led to some confusion and over-generalization of successes.

Each route of administration challenges both the humoral and cell-mediated components of the human immune system, forcing a better understanding of the influence of biomaterials on immune-mediated responses to achieve more successful administration and implant therapies, including cell therapy, gene therapy, drug delivery, and implant technologies. The biological response to legacy synthetic biodegradable polymers, such as, for example, lactides, glycolides, anhydrides, fumarates, and phosphazenes, is known and must be taken into account in planning formulations with these materials. Consequently, a degree of inflammatory response or lack of biocompatibility must be accepted when formulating small particle delivery for human therapeutic treatments with such materials due to a lack of availability of non-immunogenic materials. This lack of non-immunogenic materials has only aggravated recent attempts to conquer the challenge of particle delivery.

Conventional non-viral gene delivery systems are typically either lipid nanoparticles or polyplexes. Liposomes, micelles, polymeric micelles, polymersomes, dendrimers, and niosomes are nanoparticle systems that may each be the basis of a gene delivery system. A liposome includes amphiphilic lipid molecules, typically two-tailed phospholipids with a charged hydrophilic head, that self-assemble to form a spherical structure with a lipid bilayer shell surrounding an aqueous core containing a hydrophilic payload, such as, for example, nucleic acids. A micelle includes amphiphilic lipid molecules that self-assemble to form a monolayered, spherical vesicle structure with the polar head groups surrounding a core of the hydrophobic tails. Polymeric micelles are based on block copolymers with cationic and noncharged hydrophobic groups that self-assemble with nucleic acids to form core-shell structures. Polymersomes, similar to liposomes, are self-assembled structures composed of amphiphilic block copolymers. A dendrimer is a highly-branched spherical polymer that may be highly charged. A niosome is a spherical vesicle structure similar to a liposome except that it is typically formed from a non-ionic surfactant with a single hydrophobic tail.

Lipid nanoparticles (LNPs) describe the family of particles formed by amphiphilic structures, including, but not limited to, liposomes and micelles, which encapsulate the payload either in a hydrophilic core or a hydrophobic core, layer, or shell. Lipid nanoparticles are formed by the self-assembly of amphiphilic lipid molecules into a spherical structure. Most of the lipids conventionally used to form LNPs have a cationic polar head group, which is necessary for association with negatively charged nucleic acids. The tail portion of the lipid is typically one or more alkyl chains, which may be of varying length and degree of saturation. Other functional groups may be introduced depending on the desired functional properties of the LNP.

Conventional lipid nanoparticles typically include polyethylene glycol (PEG) on some of the polar head groups and a biologic loaded in the aqueous core. Concerns with conventional LNPs in nanoparticle delivery systems include the instability of the nanoparticle under physiological conditions due to charge screening interactions. Additionally, the presence of the PEGylated lipids that cloak the LNPs from the innate immune system can cause allergic reactions and enhanced immune responses with repeated exposures.

Polyplexes are nanoparticles formed and held together by the electrostatic interactions between a charged polymer and an oppositely charged target molecule. Cationic polymers conventionally used to form polyplexes include multiple amine functionalities that are able to assume a positive charge at physiological pH. Cationic polymers are routinely used as transfection agents, where they form polyplexes with negatively charged nucleic acids and facilitate transfer of the nucleic acid across the cellular membrane. Once inside the cell, the polyplex dissociates, and the nucleic acid is released to complete the delivery and perform its function. One concern with cationic poly(amines), such as PEI, is the cytotoxic properties at higher concentrations, which limits their delivery capacity and in vivo use. Other polymer-based transfection agents are also non-resorbable, which necessitates further cellular energy usage to eliminate the polymer from a cell that already is likely to be in a state of reduced health as a result of interaction with the polyplex components. Since cell therapies are based on using cells from sick and immunocompromised patients, this additional stress can lead to a lower yield and quality of the final cellular product.

Polymersomes are another class of polymeric carrier and are analogous to liposomes through their self-assembly but are formed from amphiphilic polymers instead of molecular lipids. Polymersomes offer additional advantages over liposomal structures in that the larger polymer molecular weight can accommodate encapsulation of larger payloads and greater flexibility to alter the charge-hydrophobicity properties. In some cases, the polymer structure also affords additional biocompatibility over small molecule lipids.

BRIEF DESCRIPTION OF THE INVENTION

There is a need for a more biocompatible gene delivery system that provides an ability to deliver biological payloads that is similar to or better than what is provided by current nanoparticle delivery systems.

In exemplary embodiments, a polymeric delivery system includes polyplexes. Each polyplex includes at least one charged polymer and at least one biologic. The at least one charged polymer includes a polyester copolymer of a polyol and a polycarboxylic acid modified with at least one charged moiety having an opposite charge from a net charge of the at least one biologic.

In exemplary embodiments, a process of forming a polymeric delivery system including polyplexes includes combining charged polymers and biologics in a solvent to electrostatically associate the charged polymers and the biologics as the polyplexes. Each of the polyplexes includes at least one of the charged polymers and at least one of the biologics. Each of the charged polymers includes a polyester copolymer of a polyol and a polycarboxylic acid modified with at least one charged moiety having an opposite charge from a net charge of the biologics.

In exemplary embodiments, a process of delivering a biologic to cells includes administering polyplexes of the biologic electrostatically associated with a charged polymer. The charged polymer includes a polyester copolymer of a polyol and a polycarboxylic acid modified with at least one charged moiety having an opposite charge from a net charge of the biologic.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
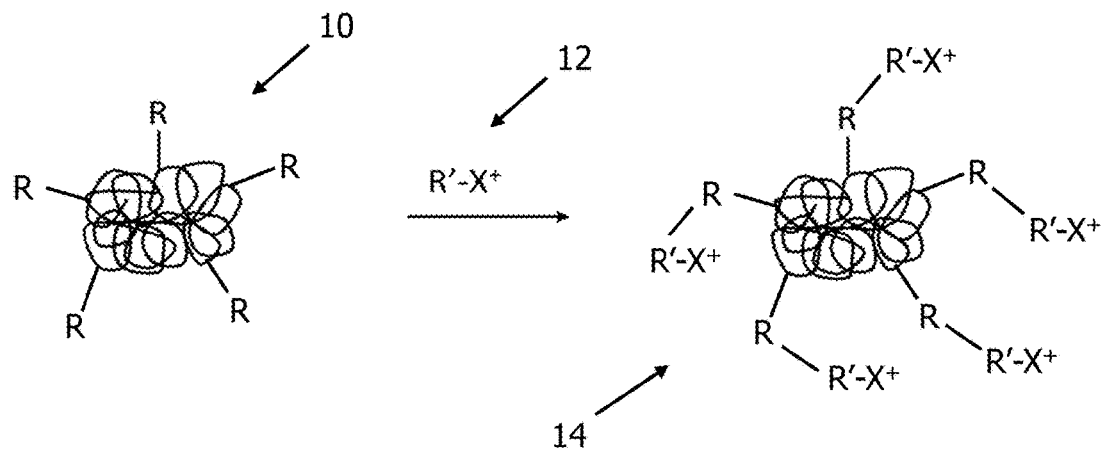
FIG. 1 schematically shows formation of a charged polymer from a polyester copolymer of a polyol and a polycarboxylic acid and a charged moiety in an embodiment of the present disclosure.

Provided are polymeric delivery systems including nanoparticles of a polymer and a biologic associated with the polymer, where the polymer includes a polyester copolymer of a polyol and polycarboxylic acid.

Embodiments of the present disclosure, for example, in comparison to concepts failing to include one or more of the features disclosed herein, provide a polymer that is non-immunogenic; provide a charged polymer structure that can be tuned to create a range of structures that can be designed to accommodate a range of payload sizes, tuned for specific degradation kinetics, and decorated with specific functional moieties for targeted delivery; utilize the immune stealth properties of poly(glycerol sebacate) (PGS) to reduce or avoid the presence of PEGylated lipids in a delivery system; leverage the low-inflammatory response to polymer degradation to provide a resorbable gene delivery vehicle that can easily be metabolized by the cell to reduce cellular stress; improve nanoparticle stability to increase blood residency time; provide a polymer platform with a customizable polymeric structure that addresses the limitations of conventional gene delivery systems; provide a block copolymer structure that can be tuned to create a range of polymeric structures that can be designed to accommodate a range of payload sizes, tuned for specific degradation kinetics, and decorated with specific functional moieties for targeted delivery; provide a delivery system for biologics with a low inflammatory response; provide a resorbable polymeric delivery vehicle that can be easily metabolized by the cell to reduce cellular stress; improve nanoparticle stability to increase blood residency time; or combinations thereof.

As used herein, "a polyester copolymer of a polyol and polycarboxylic acid" refers to any copolymer including alternating monomer units of one or more polyols and one or more polycarboxylic acids connected by ester bonds. Such copolymers may also include additional monomers that may not be polyols or polycarboxylic acids as well as additional polymeric blocks that may or may not include polyol and/or polycarboxylic acid monomers. Such copolymers may also include other functional groups. In some embodiments, the polyester copolymer of a polyol and a polycarboxylic acid includes glycerol and sebacic acid monomers.

As used herein, "polyol" refers to any monomer having more than one alcohol group.

As used herein, "polycarboxylic acid" refers to any monomer having more than one carboxylic acid group.

As used herein, "biologic" refers to any compound or component that is biologically-based and that is desirable to be delivered to, and interact with, a biological system. Exemplary biologics include, but are not limited to, nucleic acids, proteins, peptides, gene editing systems, antibodies, cytokines, and active pharmaceutical ingredients (APIs). A biologic may be naturally derived or may be synthetic in origin, including, but not limited to, synthetic or recombinant nucleic acids, synthetic peptides, or recombinant proteins. A nucleic acid biologic may be single-stranded or double-stranded and may be deoxyribonucleic acid (DNA) or ribonucleic acid (RNA). Appropriate gene editing systems may include, but are not limited to, clustered regularly interspaced short palindromic repeats (CRISPR) systems, such as, for example, CRISPR/Cas9; transposons; transcription activator-like effector nucleases (TALENs); or zinc finger nucleases (ZFNs).

In exemplary embodiments, the polymer of the polymeric delivery system includes a structure of Formula (1) shown below:

$$[[-A_a-B_b]_x-C_c-D_d]_z \quad (1)$$

where A is a polyol monomer, a=1-30, B is a polycarboxylic acid monomer, b=1-30, C is a polymer block, charged moiety, or polyol monomer, c=0-30, D is a polymer block, charged moiety, or polycarboxylic acid monomer, and d=0-30, x is an integer from 1 to 75 or any integer value, range, or sub-range therebetween, and z is an integer from 1 to 100 or any integer value, range, or sub-range therebetween.

When present, C and/or D may be customizable and tailored for the specific chemical and/or physical properties of the copolymer. In some embodiments, A associates with the biologic. In other embodiments, B associates with the biologic. In other embodiments, C associates with the biologic. In other embodiments, D associates with the biologic. In some embodiments, where the C and/or D in Formula (1) is a polymer block, the polymer block is a polyacid, a polyol, or a polyamine. Appropriate polymers may include, but are not limited to, PEG, PEI, polylysine, polyvinyl alcohol, polyvinyl acetate, hyaluronic acid, or aggrecan.

In exemplary embodiments, the polymer is associated with the biologic by a ligand interaction or a complex coordination.

In some embodiments, the polyester copolymer of a polyol and a polycarboxylic acid includes urethanes and/or acrylates at low levels that do not impact the solubility of the polymer.

In some embodiments, the polyester copolymer of a polyol and a polycarboxylic acid includes glycerol as a polyol and sebacic acid as a polycarboxylic acid. The glycerol ester moieties can be considered as polymeric, lipid-like, bis-diacid triglycerides. Furthermore, these glycerol esters are polymers constructed from metabolic building blocks that, upon degradation or erosion, feed directly into the Krebs cycle. Consequently, an unappreciated advantage of polymers such as PGS is the favorable local cell-material interaction and immune response. In contrast, degradable polymers composed of lactides and glycolides initiate an immune response by inflammatory macrophages (M1), which results from the release of lactic acid and glycolic acid as breakdown by-products. Additionally, PGS can induce stimulation of oxidative phosphorylation by the presence of glycerol ester metabolic by-products that initiate prohealing (M2) macrophage differentiation. The M2 presence is essential to mitigate, dampen, and/or control any local inflammation during a therapeutic delivery, thereby allowing the therapy to commence without the complication and chaos of an unwanted material acid by-product initiated immune response.

In some embodiments, the polymer is derivatized, such as, for example, at an alcohol of the first block or of a polyol or other tether point, with a ligand for targeted payload delivery. The ligand is designed to bind to specific cell markers which may include, but are not limited to, tumor-specific antigens, tumor-associated antigens proteins, antibodies, alphafetoprotein, carcinoembryonic antigen, cancer antigen 125 (CA-125), mucin 1 (MUC-1), epithelial tumor antigen, tyrosinase, melanoma-associated antigen, abnormal products of ras, tumor protein P53 (p53), programmed cell death protein 1 (PD-1), major histocompatibility complex (MHC) proteins, or cell-specific epitopes.

Charged Polymer

In some embodiments, the polymer is a charged polymer. In such embodiments, the C unit, when present, is a polyol monomer, or the D unit, when present is a polycarboxylic acid monomer. The charged polymer further includes at least one charged moiety, which may be a C unit, a D unit, or pendant on the A unit, B unit, C unit, and/or D unit.

In some embodiments, the polyester copolymer of a polyol and a polycarboxylic acid is a condensation reaction product of one or more polyol monomers and one or more polycarboxylic acid monomers.

Appropriate polyol monomers may include, but are not limited to, glycerol, low molecular weight PEG (about 1000 Da or less), polyvinyl alcohol, xylitol, mannitol, sorbitol, maltitol, erythritol, or isomalt. When more than one polyol monomer is copolymerized with polycarboxylic acid monomer, they may be included at any molar ratio in the range of 1:99 to 50:50.

Appropriate polycarboxylic acid monomers may include, but are not limited to, diacids having the general formula $[HOOC(CH_2)_mZ(CH_2)_nCOOH]$, where m and n=1-30 and Z is —O—, —COO—, —CO—, —S—S—, —NH—, —NZ'-, —CHZ"-, —CH═CH—, -C≡C—, or —CH═CH—CH═CH—, where Z' is —H, —CH₃, —CH₂CH₃, —CH₂CH₂NH₂, or —CH₂CH₂NHCH₃ and Z" is —H, —OH, —CH₂OH, —CH₂CH₂OH, —CH₂CH₂NH₂, or —CH₂CH₂NHCH₃.

Appropriate polycarboxylic acid monomers may include the following: malonic acid, succinic acid, glutaric acid, adipic acid, pimelic acid, suberic acid, azelaic acid, sebacic acid, oxaloacetic acid, citric acid, fumaric acid, or malic acid. When more than one polycarboxylic acid monomer is copolymerized with polyol monomer, they may be included at any molar ratio in the range of 1:99 to 50:50.

Other appropriate monomers in a charged polymer may include, but are not limited to, glutamine, lysine, or arginine.

In some embodiments, the polyester copolymer of a polyol and a polycarboxylic acid is non-linear and/or includes branching and forms a charged polymer when modified with a charged moiety. In some embodiments, the polyester copolymer of a polyol and a polycarboxylic acid has a low to moderate molecular weight. In exemplary embodiments, the weight average molecular weight of the polyester copolymer of a polyol and a polycarboxylic acid is in the range of about 2 kDa to about 50 kDa, alternatively about 2 kDa to about 30 kDa, alternatively about 2 kDa to about 15 kDa, alternatively about 2 kDa to about 10 kDa, alternatively about 5 kDa to about 50 kDa, alternatively about 10 kDa to about 50 kDa, alternatively about 10 kDa to about 25 kDa, or any value, range, or sub-range therebetween. In exemplary embodiments, the polyester copolymer of a polyol and a polycarboxylic acid is not in a thermoset state. In some embodiments, the polyester copolymer of a polyol and a polycarboxylic acid has a high polydispersity index.

In exemplary embodiments, the polyester copolymer of a polyol and a polycarboxylic acid is modified with at least one charged moiety to form a charged polymer.

In exemplary embodiments, the polyester copolymer of a polyol and a polycarboxylic acid contains two or more different polycarboxylic acids and is modified with at least one charged moiety to form a charged polymer.

In exemplary embodiments, the polyester copolymer of a polyol and a polycarboxylic acid contains two or more different polyols and is modified with at least one charged moiety to form a charged polymer.

In exemplary embodiments, the polyester copolymer of a polyol and a polycarboxylic acid contains two or more different polycarboxylic acid monomers, two or more different polyol monomers and is modified with at least one charged moiety to form a charged polymer.

Referring to FIG. 1, a polyester copolymer of a polyol and a polycarboxylic acid 10 includes multiple R functional groups. In some embodiments, the R groups include hydroxy groups, carboxyl groups, amine groups, or combinations thereof as the R groups to provide a tethering point for a charged compound 12. The charged compound 12 is shown in FIG. 1 as R'—X⁺, where the R' group represents a complimentary chemistry to the tethering moiety, R, and X⁺ represents a charged moiety. In some embodiments, the complimentary chemistry of the R' groups includes carboxyl groups to react with hydroxy groups and/or amine groups, isocyanates groups to react with hydroxy groups and/or amine groups, hydroxy groups to react with carboxyl groups, amine groups to react with carboxyl groups, acid chlorides to react with hydroxy groups and/or amine groups, ring opening reactions, or combinations thereof. In some embodiments, activating agents, such as, for example, carbonyldiimdazole or tosyl compounds, may be used. This reaction scheme allows for the derivatization of the polyester copolymer of a polyol and a polycarboxylic acid 10 to produce a charged polymer 14. The charged compound 12 may be introduced through monomers that copolymerize with the polyol and polycarboxylic acid monomers to be located within the repeat units of the polymer or the charged compound 12 may be pendant by introduction after copolymerization of the polyol and polycarboxylic acid monomers.

Appropriate charged compounds may include, but are not limited to, an amino acid, such as, for example, glutamine, lysine, or arginine, dimethylamino propanoic acid, 1,1-dimethylethylenediamine, PEI, polylysine, or hyaluronic acid.

Appropriate charged moieties may include, but are not limited to, sulfates, phosphates, sulfonates, sulfites, carboxy salts, carbohydrates, glycoproteins, ammonium, amino acids, peptides, peptide sequences such as the cell adhesion promoting arginine-glycine-aspartic acid (RGD) sequence, choline, phosphocholine, primary amines, secondary amines, tertiary amines, quaternary amines, or carboxylates.

Block Copolymer

In other embodiments, the polymer is a block copolymer. In some embodiments, the A-B group of the block copolymer of Formula (1) is a first block of Formula (2):

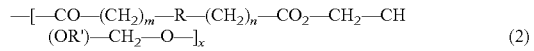

where A is —CH₂—CH(OR')—CH₂—O—; B is —CO—(CH₂)ₘ—R—(CH₂)ₙ—CO—; m and n are an integer from 1 to 30 or any integer value, range, or sub-range therebetween; R is —CH₂—, —NH—, —NCH₃—, —O—, —S—S—, —CH═CH—, —C≡C—, —CO₂—, or —CONH—; R' is hydrogen or another replaceable pendant group, and the C and/or D group of Formula (1) is a monomer or polymer block that is customizable and may be tailored for the specific chemical and physical properties of the block copolymer.

In some embodiments, the first block of the block copolymer of Formula (1) is created by the reaction of a diepoxide with a polyol. In some embodiments, the polyol is a diol. Formula (3) is an example of a diepoxide and a polyol that may be reacted together to form a polyester copolymer:

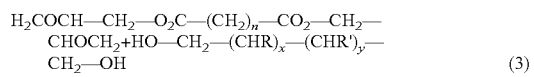

where n is an integer from 1 to 20 or any integer value, range, or sub-range therebetween; x is an integer from 1 to 10 or any integer value, range, or sub-range therebetween; y is an integer from 0 to 10, an integer from 1 to 10, or any integer value, range, or sub-range therebetween; and R and R' may independently represent —H or —OH. Such diepoxide-diol monomer pairs can provide a polymer that is substantially unbranched.

In other embodiments, the second block of the block copolymer of Formula (1) is created by the reaction of a diepoxide with a polyamine. In some embodiments, the polyamine is a diamine. Formula (4) is an example of a diepoxide and a polyamine that may be reacted together to form a polyamine copolymer:

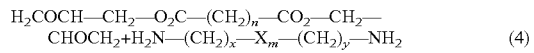

where n is an integer from 1 to 20 or any integer value, range, or sub-range therebetween; m is an integer from 0 to 10 or any integer value, range, or sub-range therebetween; x and y are independently an integer from 0 to 10 or any integer value, range, or sub-range therebetween; and X is selected to provide a specific property to the A-B block, such as, for example, a predetermined charge density, a predetermined hydrophobicity, or a predetermined hydrophilicity. Appropriate X groups may include, but are not limited to, $-CH_2-$, $-NH-$, $-CH_2-CH_2-O-$, $-CH_2-CH_2-NH-$, $-CH_2-CH_2-CH_2-CH_2-NH-$, or phenyl. Such diepoxide-diamine monomer pairs can provide a polymer that is substantially unbranched.

In some embodiments, a second block of C and/or D in Formula (1) is selected to make the block copolymer amphiphilic. In some embodiments, the second block is selected to make the copolymer hydrophilic. In some embodiments, the second block is selected to make the polymer hydrophobic. In some embodiments, the second block is selected to make the resulting copolymer a branched copolymer. In some embodiments, the second block is selected to make the resulting copolymer crosslinked. In some embodiments the second block is selected to make the resulting copolymer cationic. In some embodiments, the second block is selected to make the resulting copolymer anionic.

In some embodiments, the second block has a cationic charge, allowing for electrostatic complexation with a negatively charged biologic, such as, for example, a nucleic acid. In other embodiments, the second block has an anionic charge, allowing for electrostatic complexation with a positively charged biologic.

In exemplary embodiments, the second block is more hydrophilic than the polyester copolymer of a polyol and a polycarboxylic acid, affording solubility in aqueous solutions. In some embodiments, the values of a, b, c, d, z in Formula (1) are selected such that the block copolymer self assembles in certain aqueous environments. In some embodiments, the second block is a polyglycerol. In some embodiments, the second block is poly(vinyl alcohol). In some embodiments, the second block is a polyol, such as poly(ethylene glycol), where the number of repeats of the ethylene glycol unit is between 1 and 20. Appropriate polymers for the second block may include, but are not limited to, a polyester copolymer of another polyol and polycarboxylic acid, a hydrophilic polymer, hyaluronic acid, a polysaccharide, PEI, polylysine, polyglycolic acid, polylactic acid, or polycaprolactone.

In some embodiments, the block copolymer includes more than two blocks, such as, for example, three blocks or four blocks. For example, a tri-block copolymer may include a cationic first block, a hydrophobic second block, and an anionic or less cationic third block.

Polymeric Delivery Complexes

In exemplary embodiments, a polymeric nanoparticle platform for the delivery of a range of biologics and therapeutics is customizable to address the needs of various payloads, including, but not limited to, nucleic acids, proteins, active pharmaceutical ingredients (APIs), gene editing systems, antibodies, cytokines, and other biologics. A polyester copolymer of a polyol and a polycarboxylic acid acts as a basic building block from which a form factor is constructed. Depending on the structure of the polymer and the biologic, the form factor may be a polyplex, a micelle, a polymersome, a niosome, or a polymeric lipid nanoparticle.

In some embodiments, the nanoparticles are used for ex vivo delivery to cells.

In some embodiments, the nanoparticles are used for in vivo delivery to cells.

In some embodiments, the nanoparticles are used for in vitro delivery to cells.

In some embodiments, a polymeric delivery system provides a polymeric structure that can be tuned to create a range of nanoparticle structures that can be designed to accommodate a range of payload sizes, tuned for specific payload release kinetics, and decorated with specific functional moieties for targeted delivery.

When the polymer is a charged polymer, the charged polymers form polyplexes when combined and mixed with payload molecules of a biologic of an opposite charge, where the polyplex is held together by the opposing charges. In exemplary embodiments, the polyplexes are nanoparticles.

In some embodiments, a polyester copolymer of a polyol and a polycarboxylic acid is modified with cationic moieties to allow the resulting charged polymer to bind to negatively charged molecules, such as, for example, nucleic acids.

In some embodiments, a polyester copolymer of a polyol and a polycarboxylic acid is modified with anionic moieties to allow the charged polymers to bind to positively charged molecules, such as, for example, certain peptides or proteins.

In some embodiments, a polymeric delivery system incorporates the advantages of both polyplexes and nanoparticles in one form factor while maintaining non-immunogenic properties. The polyester copolymer of a polyol and a polycarboxylic acid acts as a base structure to which various pendant building blocks can be added for specific functionality.

Process levers to tune the performance of the polymeric nanoparticle may include, but are not limited to, the molecular weight, the charge density, the acid:alcohol ratio of the charged polymer building blocks, the crosslink density, the ratio of payload (biologic) to charged polymer, the charged moiety used, and the selection and presence of an additive.

In some embodiments, the polymeric delivery system includes an additive selected to tune at least one property of the system. Appropriate properties to be modified by an additive may include, but are not limited to, number-weighted average particle size, zeta potential, aqueous stability, cryostability, microbial resistance, plasma stability, or affinity for cell membranes. Appropriate additives may include, but are not limited to, a salt, a buffer, a surfactant, a stabilizing agent, a processing aid for cryostorage, an antimicrobial, or an adjuvant. In some embodiments, the additive tunes at least one property of the charged polymer. In some embodiments, the additive tunes at least one property of the biologic complexed with the charged polymer. In some embodiments, the additive is an adduct that inserts or assembles into the polymer-biologic complex, such as, for example, cholesterol, a lipid, a protein, a phospholipid, or a synthetic amphiphilic molecule.

When the polyol includes glycerol and a polycarboxylic acid includes sebacic acid, appropriate cationic moieties associated with PGS to maintain non-immunogenicity may include, but are not limited to, amines, ammonium, amino acids, peptides, peptide sequences such as the cell adhesion promoting arginine-glycine-aspartic acid (RGD), choline, phosphocholine, sodium ions, potassium ions, or calcium ions.

Appropriate anionic moieties associated with PGS to maintain non-immunogenicity may include, but are not limited to, sulfates, phosphates, sulfonates, sulfites, carboxy salts, carbohydrates, or glycoproteins.

As noted above, PEG is often used to cloak a lipid nanoparticle from the innate immune system, but PEG can cause allergic reactions and PEGylation is an additional step in the nanoparticle manufacturing. PGS, due its non-immunogenic properties, may reduce or eliminate the need for PEG or another cloaking material in exemplary embodiments.

In exemplary embodiments, the charged polymer is mixed with the oppositely-charged payload biologic molecules to form a polyplex to be delivered to cells. Upon delivery to cells, the payload molecules are released from the polyplex and then the charged polymer biodegrades with minimal toxicity to the cells.

In some embodiments, the ratio of the polymer to the biologic is selected to aid in tuning the average size and/or zeta potential of the resulting polymeric nanoparticles. In some embodiments, the ratio of polymer to biologic is selected to provide nanoparticles having a number average particle size in the range of about 150 nm to about 400 nm, alternatively about 200 nm to about 300 nm, or any value, range, or sub-range therebetween. In some embodiments, the ratio of polymer to biologic is selected to provide nanoparticles having a zeta potential in the range of about +10 mV to about +25 mV, alternatively about +14 to about +22 mV, or any value, range, or sub-range therebetween.

In some embodiments, the charged polymer-biologic complex may be multilayered and assembled layer-by-layer, with alternating layers of positively and negatively charged species. In some embodiments, the complex may be capped with PEG, creating a corona of hydration.

Figure 2:
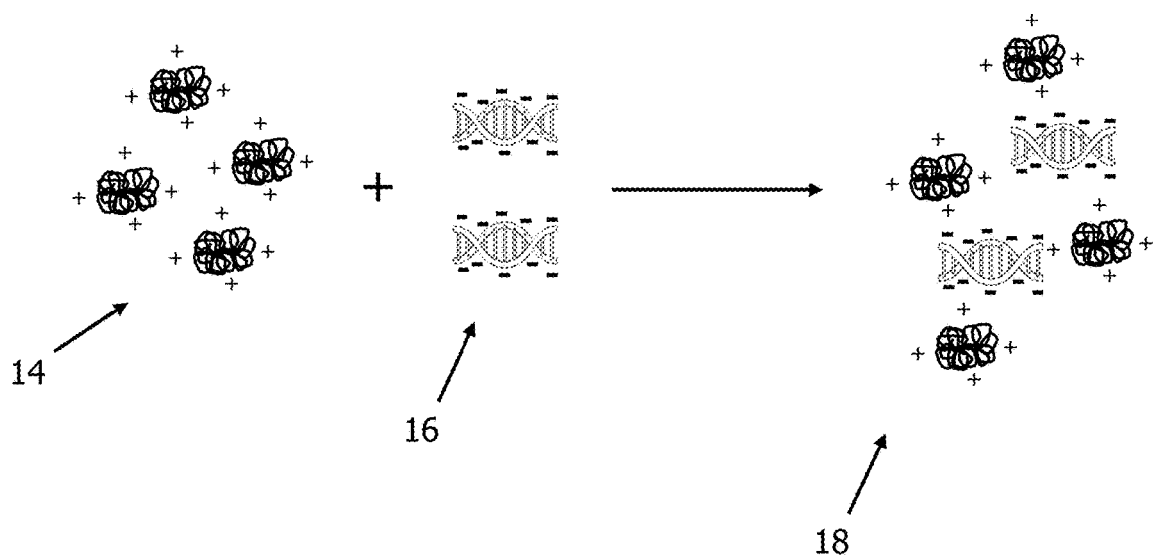
FIG. 2 schematically shows electrostatic formation of a charged polymer-nucleic acid polyplex delivery system in an embodiment of the present disclosure.

In exemplary embodiments, a polyplex delivery system is based on a building block approach to particle delivery. FIG. 1 and FIG. 2 schematically show a modular formation of a polyplex delivery system. Depending on package characteristics, which may include, but are not limited to, size or charge, various complexation technologies may be utilized. When PGS is the polyester copolymer of a polyol and a polycarboxylic acid, the modular approach to polyplex creation preferably maintains the non-immunogenic properties of PGS.

Referring to FIG. 2, the charged polymers 14 are mixed with biologics 16 that naturally have a net opposite charge to assemble into polyplexes 18 based on their opposite charges. The formed polyplexes 18 may then be used as a PGS-based polyplex delivery system. In some embodiments, the polyplexes 18 are nanoparticles. In some embodiments, the polyester copolymer of a polyol and a polycarboxylic acid 10 is modified with a cationic moiety and the biologic 16 naturally has a net negative charge, which is shown schematically as a nucleic acid in FIG. 2. In other embodiments, the polyester copolymer of a polyol and a polycarboxylic acid 10 is modified with an anionic moiety and the biologic 16 naturally has a net positive charge.

In some embodiments, a process of forming a delivery system includes combining a plurality of charged polymers and a plurality of biologics in a solvent to electrostatically associate the plurality of charged polymers and the plurality of biologics resulting in a plurality of polyplexes, each polyplex of the plurality of polyplexes comprising at least one of the plurality of charged polymers and at least one of the plurality of biologics. Each of the plurality of charged polymers includes a polyester copolymer of a polyol and a polycarboxylic acid modified with at least one charged moiety having an opposite charge from a net charge of the plurality of biologics. In some embodiments, the combining includes mixing. In some embodiments, the combining includes sonication. In some embodiments, the combining includes microfluidic mixing. In some embodiments, the solvent is an aqueous solvent. In some embodiments, the aqueous solvent is a pH-buffered aqueous solvent. In some embodiments, the solvent is a co-solvent composition of ethanol and water. In some embodiments, the solvent includes dimethyl sulfoxide (DMSO).

In some embodiments, the charged polymer and/or the polyplex contains a high charge density or high valences to improve the stability of the charged polymer and/or the polyplex for storage in solution prior to use. In some embodiments, the charged polymer and/or the polyplex is lyophilized and maintained in a low moisture environment for storage prior to use.

When the polymer is a block copolymer, C in Formula (1) may be a polymer block selected to have an opposite charge from the biologic such that electrostatic complexation forms self-assembled particles of polyplexes.

An appropriate size for the polyplexes of the polyplex delivery system is in the range of 1 nanometer (nm) to 1000 nm, alternatively about 10 nm to about 1000 nm, alternatively about 50 nm to about 1000 nm, alternatively about 100 nm to about 900 nm, alternatively about 200 nm to about 800 nm, alternatively about 100 nm to about 500 nm, alternatively about 50 nm to about 100 nm, alternatively about 50 nm to about 200 nm, alternatively about 50 nm to about 500 nm, alternatively about 50 nm to about 800 nm, alternatively about 100 nm to about 200 nm, alternatively about 300 nm to about 500 nm, alternatively about 500 nm to about 900 nm, or any value, range, or sub-range therebetween. Although particles are generally described herein as nanoparticles, the polyplex number-weighted average particle size may extend into the microparticle size range in some embodiments.

While the polyplex nanoparticle delivery system has been described primarily for delivery of anionic nucleic acids as the biologic, the polymeric delivery system can be altered to deliver other anionic biologics or cationic biologics. Other appropriate charged biologics may include, but are not limited to, enzymes, proteins, APIs, peptides, amino acids, gene editing systems, antibodies, cytokines, or aptamers.

The cationic feature of a charged polymer described herein and shown in FIG. 1 may be replaced with an anionic feature depending on the charge of the biologic.

In some embodiments, a process of delivering a biologic to cells includes administering polyplexes of the biologic electrostatically associated with a charged polymer, the charged polymer comprising a polyester copolymer of a polyol and a polycarboxylic acid modified with at least one charged moiety having an opposite charge from a net charge of the biologic. In some embodiments, the polyplexes are administered parenterally.

In some embodiments, the values of a, b, c, d, x, and z in Formula (1) are selected such that the block copolymer, either alone or in combination with a biologic, self assembles to form a polymersome.

In some embodiments, the values of a, b, c, d, x, and z in Formula (1) are selected such that the block copolymer, either alone or in combination with a biologic, forms self-assembled particles of polymeric micelles.

In some embodiments, the self-assembled particles are nanoparticles. An appropriate size for the self-assembled particles of the polymeric delivery system is in the range of 1 nanometer (nm) to 1000 nm, alternatively about 50 nm to about 1000 nm, alternatively about 100 nm to about 900 nm, alternatively about 200 nm to about 800 nm, alternatively about 100 nm to about 500 nm, alternatively about 50 nm to about 100 nm, alternatively about 50 nm to about 200 nm, alternatively about 50 nm to about 500 nm, alternatively about 50 nm to about 800 nm, alternatively about 100 nm to about 200 nm, alternatively about 300 nm to about 500 nm, alternatively about 500 nm to about 900 nm, or any value, range, or sub-range therebetween. Although particles are generally described herein as nanoparticles, the particle size may extend into the microparticle size range in some embodiments.

Figure 3:
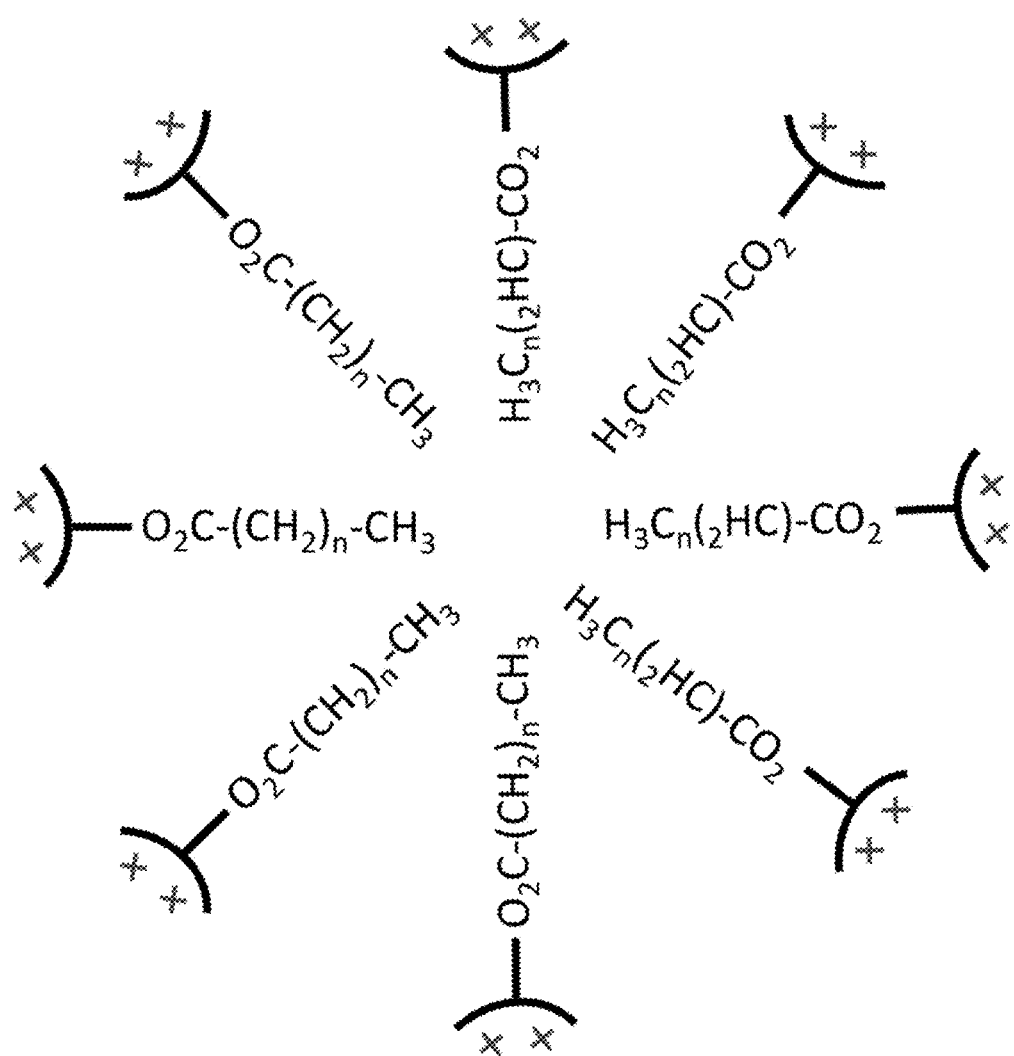
FIG. 3 schematically shows a polymeric micelle of a biologic and a block copolymer, in an embodiment of the present disclosure.
Figure 4:
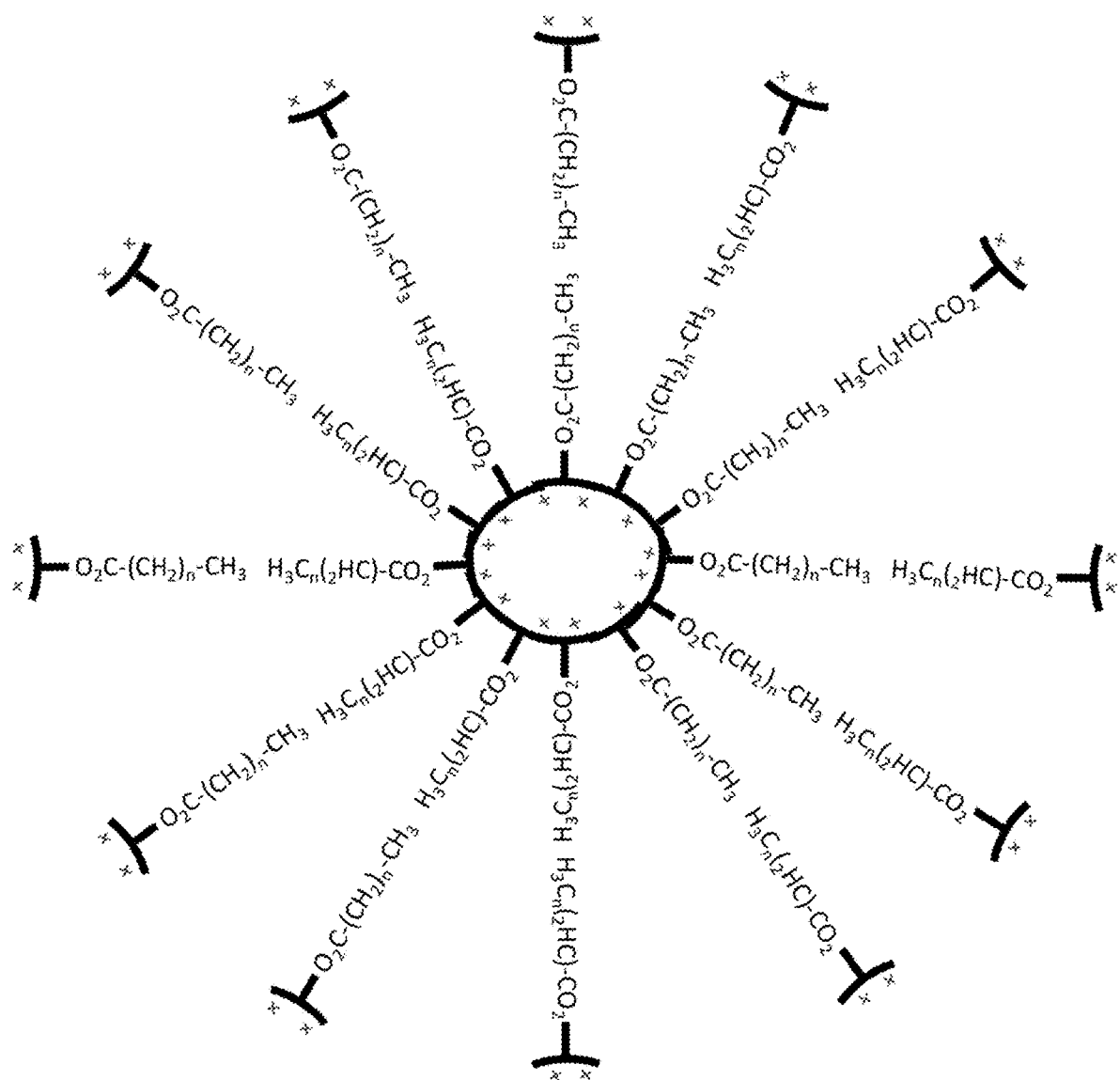
FIG. 4 schematically shows a polymersome of a biologic and a block copolymer, in an embodiment of the present disclosure.

In exemplary embodiments, a polymeric delivery system including a block copolymer is based on a building block approach to particle delivery. FIG. 3 and FIG. 4 schematically show two molecular formulations of a polymeric delivery system from a block copolymer and a biologic. In FIG. 3, the block copolymer and the biologic have self-assembled into a polymeric micelle. In FIG. 4, the block copolymer and the biologic have self-assembled into a polymersome. Alternatively to the tethered hydrophobic chains shown in FIG. 3 and FIG. 4, the block copolymer may include a hydrophobic first block polymer or a hydrophobic second block polymer. Depending on package characteristics, which may include, but are not limited to, size, hydrophobicity, or charge, various particle technologies may be utilized. The modular approach to particle creation maintains the non-immunogenic properties of polymers of constituent monomers along with the bioresorbable nature of the first block.

Referring to Formula (1), the alcohol of the A-B first block of a polyester copolymer of a polyol and a polycarboxylic acid of a block copolymer is underivatized and C is used to impart functionality to the delivery system, such as, for example, charge, hydrophilicity, or molecular weight.

In some embodiments, the alcohol group of the first block is used as a tethering moiety which can be derivatized to impart additional functionality, where the alcohol is converted to an alkyl tail to impart amphiphilicity to the delivery system, which allows for the formation of the polymeric micellular structures, as shown schematically in FIG. 3, and polymersome structures, as shown schematically in FIG. 4. The alkyl tail may be a single tail or a double tail. The alkyl tail may include any appropriate degree of unsaturation, including saturated. The alkyl tail may be of any appropriate length, such as, for example, in the range of $C_5$ and $C_{22}$, including any integer value, range, or sub-range between 5 and 22. In some embodiments, the anionic biologic is a single-stranded or double-stranded nucleic acid and may be DNA or RNA.

In exemplary embodiments, the alcohol group of the first block is derivatized with a charged molecule or polymer to increase the overall charge characteristic of the delivery system.

In some embodiments the alcohol of the first block is derivatized with PEG to increase the hydrophilicity of the delivery system and provide an aqueous corona around the nanoparticle.

It will be appreciated by those skilled in the art that derivatization of the alcohol group in the first block creates a degradable linkage, allowing for degradation of the polymeric delivery system upon payload delivery.

In some embodiments, a process of forming a polymeric delivery system includes combining a block copolymer and a biologic in a solvent to form self-assembled particles including the block copolymer and the biologic associated with the block copolymer. In some embodiments, the combining includes mixing. In some embodiments, the combining includes sonication. In some embodiments, the combining includes microfluidic mixing. In some embodiments, the solvent is an aqueous solvent. In some embodiments, the aqueous solvent is a pH-buffered aqueous solvent. In some embodiments, the solvent is a co-solvent composition of ethanol and water. In some embodiments, the solvent includes DMSO.

In some embodiments, the formed polymeric delivery system is in the form of polymeric micelles. FIG. 3 shows hydrophobic moieties on some of the alcohols of the first block, and the second block of the block copolymer containing charged groups forming an electrostatic interaction with an oppositely charged biologic. The block copolymers and biologics self-assemble in an aqueous solvent into micelle-like structures having a core of the hydrophobic moieties.

In some embodiments, the formed polymeric delivery system is in the form of polymersomes. FIG. 4 shows hydrophobic moieties grafted from some of the alcohol groups of the first block and the second block of one of the block copolymers containing charged groups forming an electrostatic interaction with an oppositely charged biologic. The block copolymer and biologic self-assemble in a solvent into polymersomes having a bilayer of the hydrophobic moieties and a core including the charged second blocks complexed with the biologic.

In some embodiments, the micelles or polymersomes described above are designed to be used with conventional lipid nanoparticle technology to create a hybrid nanoparticle. A conventional lipid nanoparticle is composed of amphiphilic lipids, where the charged head group associates with an oppositely charged core. The resulting structure exposes the hydrophobic tails on the outside of the particle. The amphiphilic block copolymer described herein can orient so that the hydrophobic tails of the polymer complex with the hydrophobic tails of the lipid nanoparticle. The addition of the polymeric component to the hybrid particle stabilizes and protects the LNP core from dissociation, opsonizing proteins, or the innate or adaptive immune response. Furthermore, the polymer may be derivatized with targeting ligands to create a hybrid nanoparticle capable of delivering a payload to specific biological targets.

In some embodiments, the polymeric delivery system is designed so as to incorporate specific segments that are capable of interacting with moieties of the biologic payload so as to create amorphous solid dispersions, condense the payload as to produce a smaller particle, augment release kinetics, stabilize the biologic, protect the biologic against opsonization or other attacks of the immune system, improve plasma stability to allow for longer circulation time, or other benefits.

In some embodiments, a hybrid particle system is created where the polymeric delivery system acts as a condensing agent, producing a smaller payload particle that can be further processed using standard lipid nanoparticle forming approaches.

In some embodiments, the block copolymers are lyophilized and maintained in a low moisture environment for storage prior to use.

While the polymeric delivery system has been described primarily for delivery of anionic nucleic acids as the biologic, the polymeric delivery system can be altered to deliver cationic or uncharged biologics, including, but not limited to, enzymes, proteins, APIs, peptides, amino acids, or aptamers.

The cationic feature described herein and shown in FIG. 3 and FIG. 4 may be replaced with anionic, neutral, hydrophobic, or hydrophilic moieties depending on the binding mechanism between the block copolymer and the biologic.

In some embodiments, the biologic is polar or hydrophilic or includes polar or hydrophilic regions which associate with polar or hydrophilic portions or regions of the block copolymer.

In some embodiments, the biologic is non-polar or hydrophobic or includes non-polar or hydrophobic regions which associate with non-polar or hydrophobic portions or regions of the block copolymer.

In some embodiments, a process of delivering a biologic to cells includes administering self-assembled particles comprising block copolymers and the biologic associated with block copolymers. In some embodiments, the self-assembled particles are administered parenterally.

Other applications for a polymeric delivery system may include, but are not limited to, formation of chimeric antigen receptor T cells (CAR-T cells); treatment of solid tumors or blood cancers; other cell/gene based therapies including, but not limited to: Tumor-Infiltrating Lymphocyte (TIL) therapies, engineered T-cell receptor (TCR) therapies, Natural Killer (NK) therapies, ocular cell therapies, neuronal cell therapies, skin cell therapies, beta cell therapies, pluripotent stem cell therapies, adult stem cell therapies, cancer stem cell therapies, dendritic cell therapies, lymphokine-activated killer (LAK) cell therapies, cytokine-induced killer (CIK) cell therapies, γδ T cell therapies, cord blood (CB) cell therapies, hematopoietic stem cell (HSC) therapies, mesenchymal stem cell (MSC) therapies; enzyme encapsulation for bioremediation of plastics; controlled release of fertilizer, growth enhancers, pesticides, or herbicides in an agricultural environment; controlled delivery of external stimuli responsive materials, such as, for example, nanoparticle degradation upon exposure to a specific pH range causing release of an encapsulated dye for colorimetric detection or nanoparticle degradation upon application of mechanical stress, or shear causing release of a payload for internal sensing for a rubber belt or tire; or transdermal delivery.

In some embodiments, such as, for example, where the polymeric delivery system provides solid tumor cancer therapy, the charged polymer of the polyplexes includes glutamine. In some embodiments, the glutamine is incorporated within the repeat units of the charged polymer as an additional monomer with the polyol and polycarboxylic acid for the polymerization step. In some embodiments, the glutamine is used to modify the formed polyester copolymer of a polyol and a polycarboxylic acid to provide a pendant charged moiety to the charged polymer.

In some embodiments, a polyplex, as described herein, is coated onto one or more surfaces of a textile graft or other implant to aid in inducing blood clotting at the surface of the implant. For example, aneurysm repair by textile grafts often results in blood leakage through suture hole vias, resulting in delayed clot formation and fugitive thrombosis. A coating of the polyplex induces clotting at the textile graft surface by attracting blood platelets to the coated surface that leads to blood clotting, thereby plugging holes and stopping blood leakage through the graft.

EXAMPLES

The invention is further described in the context of the following examples which are presented by way of illustration, not of limitation.

Example 1

Poly(glycerol sebacate) was synthesized by a water-mediated process as described in U.S. Pat. No. 9,359,472, issued Jun. 7, 2016. 15 g of the poly(glycerol sebacate) was then placed into a reactor and 15 g of dimethylamino propanoic acid was added. This mixture was then heated and maintained under a nitrogen flow at 120° C. for 24 hours. The resulting mixture was purified by reversed phase column chromatography to give a charged polymer of a cationic modified poly(glycerol sebacate) polymer. Gel permeation chromatography (GPC) results showed the resulting charged polymer having a weight average molecular weight of 4500 Da and a polydispersity index (Đ) of 3.0. Dynamic light scattering (DLS) results showed a 78-nm average particle size and +20 mV zeta potential.

Example 2

Figure 5A:
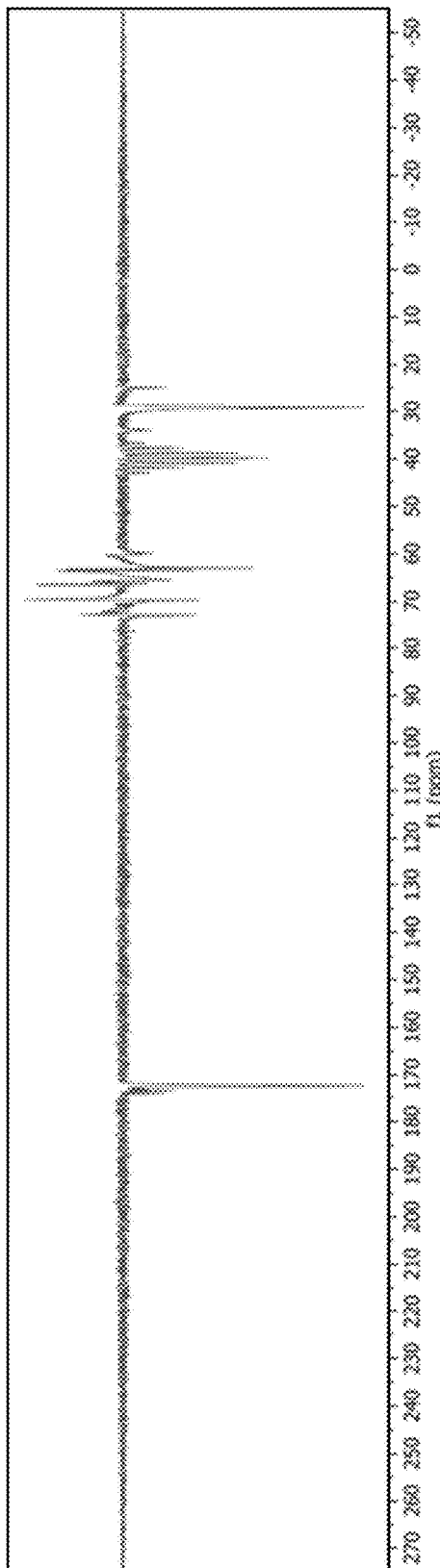
FIG. 5A shows the attached proton test (APT) $^{13}$C-NMR spectrum of poly((glycerol sebacate10% succinate90%)-co-xylitol).

Poly((glycerol sebacate$_{10\%}$ succinate$_{90\%}$)-co-xylitol) was synthesized using a water-mediated process. Glycerol (100.0 g), sebacic acid (22.0 g), succinic acid (115.4 g), and water (25.4 g) were added to a reactor. The mixture was then melted and maintained at a temperature of 120° C. for 48 hours under nitrogen flow and mechanical stirring. Xylitol (26.0 g) was then added to the reaction mixture, which was allowed to stir for 24 hours. GPC results showed the resulting polymer having a weight average molecular weight of 4500 Da (Đ 4.8). FIG. 5A shows the APT $^{13}$C-NMR spectrum of poly((glycerol sebacate10% succinate90%)-co-xylitol).

Figure 5B:
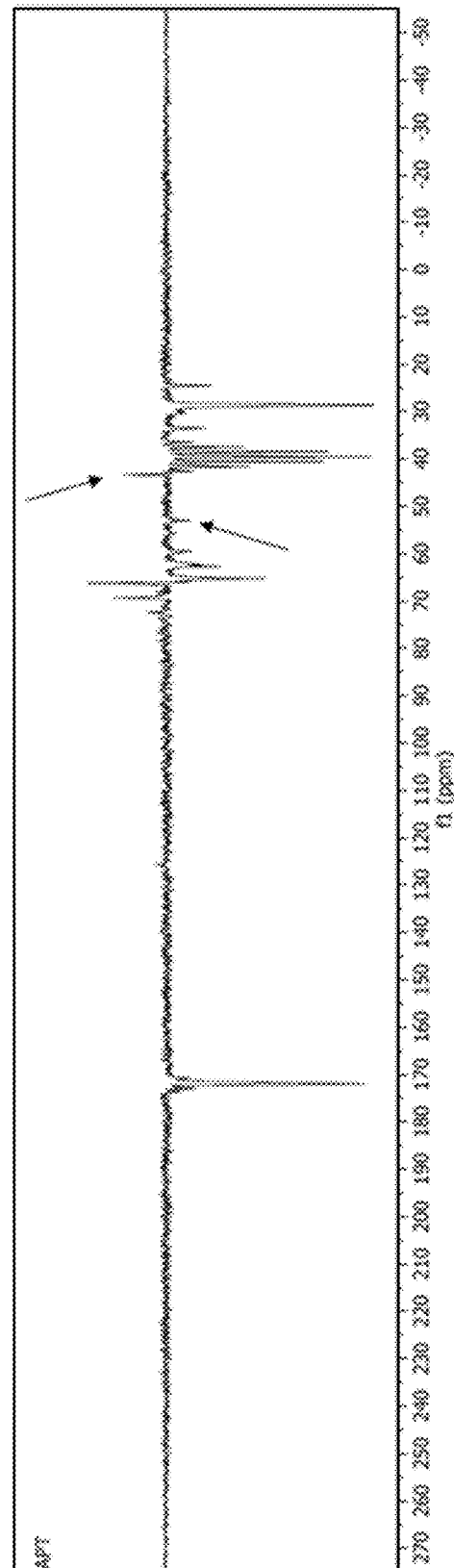
FIG. 5B shows the APT $^{13}$C-NMR spectrum of poly ((glycerol sebacate10% succinate90%)-co-xylitol dimethylaminopropylamine).

15 g of the poly((glycerol sebacate$_{10\%}$ succinate$_{90\%}$)-co-xylitol) was reacted with dimethylamino propanoic acid (15 g) with p-toluenesulfonic acid as the catalyst for 24 hours at 130° C. in the melt with mechanical stirring to form poly ((glycerol sebacate$_{10\%}$ succinate$_{90\%}$)-co-xylitol dimethylaminopropylamine). The resulting mixture was then placed in a dialysis tubing and dialyzed for 4 days and then freeze dried. GPC results showed the resulting polymer having a weight average molecular weight of 9800 Da (Đ 1.9). FIG. 5B shows the APT $^{13}$C-NMR spectrum of poly((glycerol sebacate10% succinate90%)-co-xylitol dimethylaminopropylamine). The peaks at 53 and 42 ppm (arrows) represent the tertiary amine after addition of dimethylamino propanoic acid.

Figure 6:
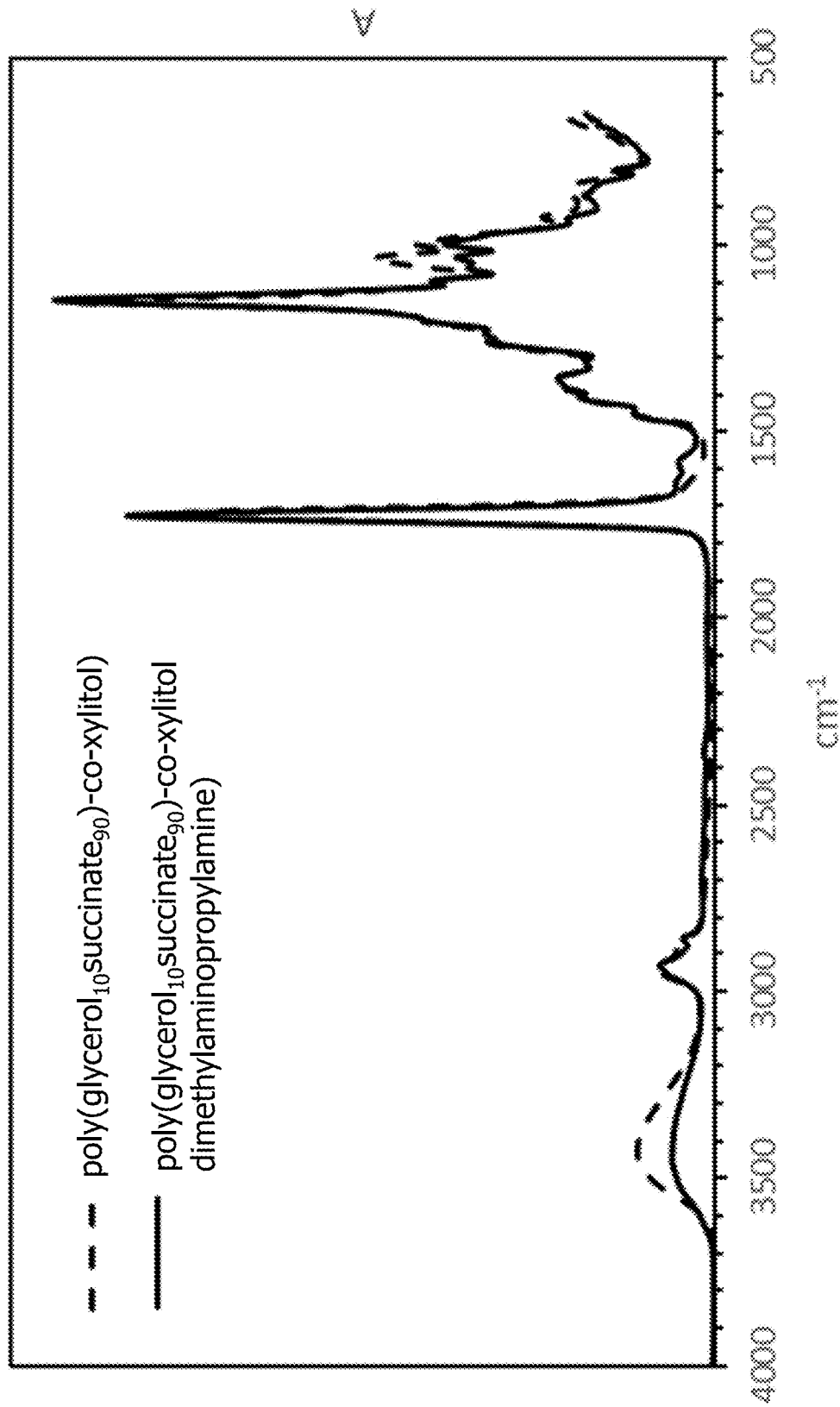
FIG. 6 shows the Fourier-transform infrared attenuated total reflection (FTIR-ATR) spectra of poly((glycerol sebacate10% succinate90%)-co-xylitol) and poly((glycerol sebacate10% succinate90%)-co-xylitol dimethylaminopropylamine).

FIG. 6 shows the FTIR-ATR spectra of poly((glycerol sebacate10% succinate90%)-co-xylitol) (dashed line) and poly((glycerol sebacate10% succinate90%)-co-xylitol dimethylaminopropylamine) (solid line). The absorbance at 1586 cm$^{-1}$ (arrow) represents the tertiary amine after addition of dimethylamino propanoic acid. The subsequent decrease in the —OH absorbance at 3400 cm$^{-1}$ further indicates reaction with the —OH group of the polyol monomer.

Example 3

Poly((glycerol sebacate$_{10\%}$ succinate$_{90\%}$-co-xylitol dimethylaminopropylamine) from Example 2 was run through a size exclusion column to yield a low dispersity polymer (Mw 4500 Đ 2). This polymer was then reacted with carbonyldiimidazole and stirred for 3 hours. 1,1-dimethylethylenediamine was then added and allowed to stir for 12 hours. The resulting mixture was then placed in a dialysis tubing and dialyzed for 4 days and then freeze dried. GPC results showed the resulting polymer having a weight average molecular weight of 1546 Da (Đ 1.1).

Example 4

Poly((PEG300)$_{10\%}$ glycerol$_{90\%}$ succinate)-co-xylitol) was synthesized using a water-mediated process. Glycerol (71.7 g), polyethylene glycol 300 (25.9 g), succinic acid (175 g), and water (20.2 g) were added to a reactor and heated to 120° C. under nitrogen flow with mechanical stirring for 48 hours. Xylitol (27.3 g) was then added and the reaction was run for an additional 24 hours. GPC results showed the resulting polymer having a weight average molecular weight of 5300 Da (Đ 5.3).

15 g of the poly((PEG300)$_{10\%}$ glycerol$_{90\%}$succinate)-co-xylitol) (15 g) was reacted with dimethylamino propanoic acid (15 g) with p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 10,800 Da (Đ 1.20). FTIR showed an absorbance at 1586 cm$^{-1}$, indicating the functionalization of the polymer.

Example 5

Poly((glycerol succinate)-co-xylitol) was synthesized using a water-mediated process. Glycerol (100.0 g), succinic acid (128.0 g), and water (25.4 g) were added to a reactor. The mixture was then melted and maintained at a temperature of 120° C. for 24 hours under nitrogen flow and mechanical stirring. Xylitol (22.8 g) was then added to the reaction mixture, which was allowed to stir for 24 hours. GPC results showed the resulting polymer having a weight average molecular weight of 2724 Da (Đ 3.6).

15 g of the poly((glycerol succinate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 20,200 Da (Đ 1.52). FTIR showed an absorbance at 1586 cm$^{-1}$, indicating the functionalization of the polymer.

Example 6

Poly(((PEG300)$_{10\%}$ glycerol$_{90\%}$ glutarate)-co-xylitol) was synthesized using a water-mediated process. Glycerol (94 g), polyethylene glycol 300 (34.1 g) (PEG300), glutaric acid (150 g), and water (26.6 g) were added to a reactor. The mixture was then melted and maintained at a temperature of 120° C. for 48 hours under nitrogen flow and mechanical stirring. Xylitol (30.5 g) was then added to the reaction mixture, which was allowed to stir for 24 hours. GPC results showed the resulting polymer having a weight average molecular weight of 8280 Da (Đ 8.6).

15 g of the poly(((PEG300)$_{10\%}$ glycerol$_{90\%}$ glutarate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 24,980 Da (Đ 1.50). FTIR showed an absorbance at 1586 cm$^{-1}$, indicating the functionalization of the polymer.

Example 7

Poly(((TPEG1000)$_{50\%}$ glycero$_{150\%}$ succinate)-co-xylitol) was synthesized using a water-mediated process. Glycerol (19.49 g), trimethylolpropane ethoxylate 1000 (214.83 g) (TPEG1000), succinic acid (50.0 g), and water (9.9 g) were added to a reactor. The mixture was then melted and maintained at a temperature of 120° C. for 48 hours under nitrogen flow and mechanical stirring. Xylitol (29.4 g) was then added to the reaction mixture, which was allowed to stir for 24 hours. GPC results showed the resulting polymer having a weight average molecular weight of 4850 Da (Đ 4.1).

15 g of the poly(((TPEG1000)$_{50\%}$ glycerol$_{50\%}$ succinate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 4,270 Da (Đ −1.52) FTIR showed an absorbance at 1586 cm$^{-1}$, indicating the functionalization of the polymer.

Example 8

Poly(((PEG600)$_{25\%}$ glycero$_{175\%}$ succinate)-co-xylitol) was synthesized using a water-mediated process. Glycerol (73.1 g), polyethylene glycol 600 (158.9 g) (PEG600), succinic acid (125.0 g), and water (24.8 g) were added to a reactor. The mixture was then melted and maintained at a temperature of 120° C. for 48 hours under nitrogen flow and mechanical stirring. Xylitol (38.18 g) was then added to the reaction mixture, which was allowed to stir for 24 hours. GPC results showed the resulting polymer having a weight average molecular weight of 3380 Da (Đ 3.4).

15 g of the poly(((PEG600)$_{25\%}$ glycero$_{175\%}$ succinate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 2900 (Đ 1.7). FTIR showed an absorbance at 1586 cm$^{-1}$, indicating the functionalization of the polymer.

Example 9

Poly(((PEG600)$_{10\%}$ glycerol$_{90\%}$ succinate)-co-xylitol) was synthesized using a water-mediated process. Glycerol (87.7 g), polyethylene glycol 600 (63.6 g), succinic acid (125.0 g), and water (24.8 g) were added to a reactor. The mixture was then melted and maintained at a temperature of 120° C. for 48 hours under nitrogen flow and mechanical stirring. Xylitol (30.11 g) was then added to the reaction mixture, which was allowed to stir for 24 hours. GPC results showed the resulting polymer having a weight average molecular weight of 4895 Da (Đ 4.8).

15 g of the poly(((PEG600)$_{10\%}$ glycerol$_{90\%}$ succinate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 5210 (Đ 1.50). FTIR showed an absorbance at 1586 cm$^{-1}$, indicating the functionalization of the polymer.

Example 10

Poly((glycerol glutarate)-co-xylitol) was synthesized using a water-mediated process. Glycerol (100.0 g), glutaric acid (143.0 g), and water (25.4 g) were added to a reactor. The mixture was then melted and maintained at a temperature of 120° C. for 48 hours under nitrogen flow and mechanical stirring. Xylitol (26.8 g) was then added to the reaction mixture, which was allowed to stir for 24 hours. GPC results showed the resulting polymer having a weight average molecular weight of 4986 Da (Đ 5.5).

15 g of the poly((glycerol glutarate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 25,100 Da (Đ 1.38). FTIR showed an absorbance at 1586 cm$^{-1}$, indicating the functionalization of the polymer.

Example 11

Poly((glycerol glutarate$_{50\%}$ succinate$_{50\%}$)-co-xylitol) was synthesized using a water-mediated process. Glycerol (100.0 g), glutaric acid (71.7 g), succinic acid (64.1 g), and water (25.4 g) were added to a reactor. The mixture was then melted and maintained at a temperature of 120° C. for 48 hours under nitrogen flow and mechanical stirring. Xylitol (26.0 g) was then added to the reaction mixture, which was allowed to stir for 24 hours. GPC results showed the resulting polymer having a weight average molecular weight of 5141 Da (Đ 5.5).

15 g of the poly((glycerol glutarate$_{50\%}$ succinate$_{50\%}$)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 7500 Da (Đ 1.58). FTIR showed an absorbance at 1586 cm$^{-1}$, indicating the functionalization of the polymer.

Example 12

Poly((glycerol adipate)-co-xylitol) was synthesized using a water-mediated process. Glycerol (125.0 g), adipic acid (198.0 g), and water (32.0 g) were added to a reactor. The mixture was then melted and maintained at a temperature of 120° C. for 48 hours under nitrogen flow and mechanical stirring. Xylitol (35.5 g) was then added to the reaction mixture, which was allowed to stir for 24 hours. GPC results showed the resulting polymer having a weight average molecular weight of 9842 Da (Đ 10.5).

15 g of the poly((glycerol adipate)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried.

Example 13

Poly((glycerol adipate$_{50\%}$ succinate$_{50\%}$)-co-xylitol) was synthesized using a water-mediated process. Glycerol (113.0 g), adipic acid (90.0 g), succinic acid (73.0 g), and water (14.0 g) were added to a reactor. The mixture was then melted and maintained at a temperature of 120° C. for 48 hours under nitrogen flow and mechanical stirring. Xylitol (29.0 g) was then added to the reaction mixture, which was allowed to stir for 24 hours. GPC results showed the resulting polymer having a weight average molecular weight of 7037 Da (Đ 7.1).

15 g of the poly((glycerol adipate$_{50\%}$ succinate$_{50\%}$)-co-xylitol) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried. GPC results showed the resulting polymer having a weight average molecular weight of 9500 Da (Đ 1.56). FTIR showed an absorbance at 1586 cm$^{-1}$, indicating the functionalization of the polymer.

Example 14

Poly((glycerol$_{50\%}$ xylitol$_{50\%}$) succinate) was synthesized using a water-mediated process. Glycerol (19.5 g), xylitol (32.2 g), succinic acid (50.0 g), and water (9.9 g) were added to a reactor. The mixture was then melted and maintained at a temperature of 120° C. for 24 hours under nitrogen flow and mechanical stirring. GPC results showed the resulting polymer having a weight average molecular weight of 1219 Da (Đ 1.9).

15 g of the poly((glycerol$_{50\%}$ xylitol$_{50\%}$) succinate) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried.

Example 15

Poly(glycerol succinate) was synthesized using a water-mediated process. Glycerol (100.0 g), succinic acid (128.0 g), and water (25.4 g) were added to a reactor. The mixture was then melted and maintained at a temperature of 120° C. for 48 hours under nitrogen flow and mechanical stirring. GPC results showed the resulting polymer having a weight average molecular weight of 3,064 Da (Đ 3.2).

15 g of the poly(glycerol succinate) was reacted with dimethylamino propanoic acid (15 g) with 1% p-toluenesulfonic acid as the catalyst for 24 hours at 130° C. in the melt with mechanical stirring. The resulting mixture was then placed in a dialysis tubing and dialyzed for 4 days and then freeze dried.

Example 16

Poly (glycerol N-methyliminodiacetate) was synthesized by adding glycerol (3 g) to a round bottom flask with a magnetic stirrer and heating to 120° C. under nitrogen flow. N-Methyliminodiacetic acid (4.8 g) was added slowly until a homogenous mixture was observed. The reaction was them allowed to stir for 4 hours at 120° C. The reaction mixture was then dissolved into deionized water and dialyzed. GPC results showed the resulting polymer having a weight average molecular weight of 3,000 Da ($\simeq$1.6).

Example 17

The charged polymer of cationic modified PGS of Example 1 was mixed with mRNA containing a GFP reporter (DasherGFP mRNA, Aldevron, Fargo, ND) in 1:1, 1:2, 1:4, and 1:16 weight ratios of mRNA to charged polymer. The mixture was shaken on an orbital shaker at 100 rpm for 20 minutes to form polyplex particles ranging in size from nanometers to micrometers when viewed under a microscope.

Example 18

The polyplex particles of Example 17 at an mRNA:charged polymer weight ratio of 1:2 were introduced to cells such that 500 ng total mRNA was present per well in a 24-well plate containing human cardiac fibroblasts seeded at a density of $7.38 \times 10^4$ cells per well. The polyplex particles were incorporated into the cells, and the GFP reporter fluorescence indicated successfully transfected cells after 21 hours. Transfected cells were visible under a fluorescence microscope and under a light microscope.

Example 19

Poly((glycerol sebacate$_{10\%}$ succinate$_{90\%}$)-co-xylitol dim-ethylaminopropylamine) (PGSSuX 1-9 D) of Example 2 was used to prepare polyplex particles with 0.25 µg of Dasher mRNA (Aldevron) to express a GFP reporter in human cardiac fibroblasts. 10 µL of polyplex particles prepared at a weight ratio of 100:1 PGSSuX 1-9 D:mRNA were added to cells cultured in a 96-well microplate containing 12,500 cells per well. The transfection of the cells was monitored with a Cellink CELLCYTE X (Cytena GmbH, Freiburg, Germany) live cell imaging system over a period of 96 hours, with images of cells being taken once every hour during transfection. An image taken at three hours post-transfection showed that no transfection was seen at early timepoints. An image taken at five hours post-transfection showed visible evidence of some successful transfection. An increasing number of cells exhibited fluorescence due to transfection with the mRNA at later timepoints, for example, at 18 hours post-transfection.

Example 20

Poly((glycerol sebacate$_{10\%}$ succinate$_{90\%}$)-co-xylitol dim-ethylaminopropylamine) (PGSSuX 1-9 D) of Example 2 was used to prepare polyplex particles with 12.6 µg of gWiz pDNA (Aldevron), having a size of 5757 base pairs, to express a GFP reporter in mouse NIH/3T3 cells (American Type Tissue Culture, Manassas, VA). 10 µL of polyplex particles prepared at a weight ratio of 140:1 PGSSuX 1-9 D:pDNA were added to cells cultured in a 96-well microplate containing 10,000 cells per well. Transfection of cells was monitored with a Cellink CELLCYTE X (Cytena) live cell imaging system over a period of 96 hours with images of cells taken once every hour during transfection. 10% of cells were transfected after 29 hours following addition of the PGS polyplex particles.

Example 21

Figure 7:
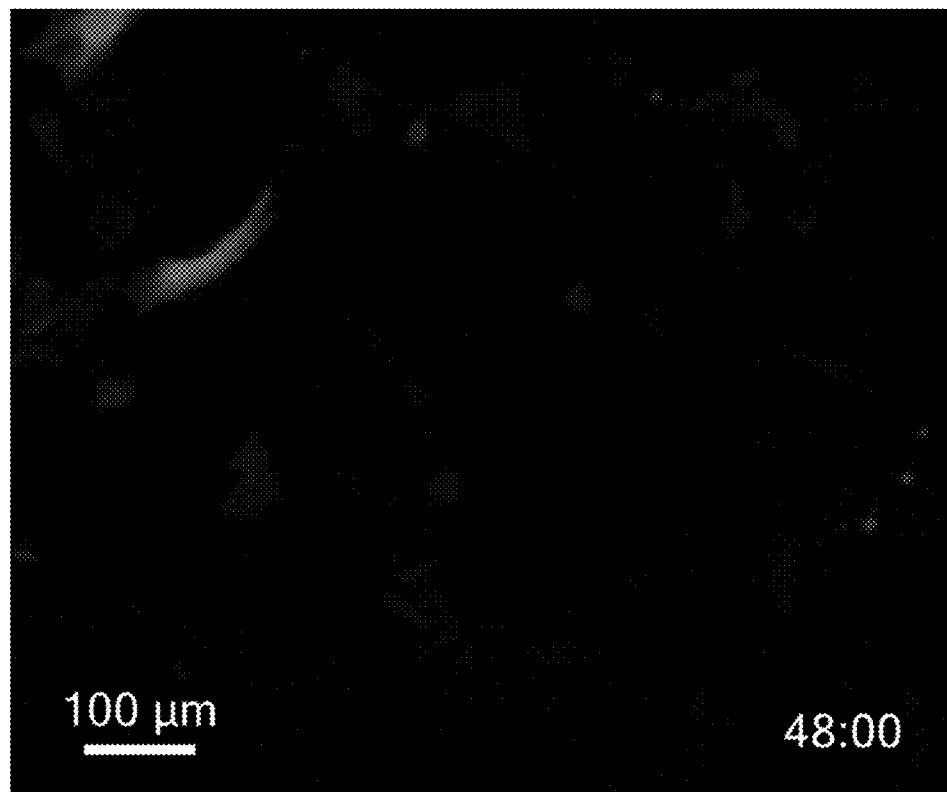
FIG. 7 shows an image obtained by a fluorescence microscope with successful transfection of primary human cardiac fibroblast cells after 48 hours of exposure to polyplexes indicated by the lighter areas of the image.

Poly((glycerol sebacate$_{10\%}$ succinate$_{90\%}$)-co-xylitol dim-ethylaminopropylamine) (PGSSuX 1-9 D) of Example 2 was used to prepare polyplex particles with 20 pg of Dasher GFP mRNA (Aldevron), having a size of 755 nucleotides with a 250 nucleotide poly(A) tail, delivered per cell to express a GFP reporter in primary human cardiac fibroblast cells (PromoCell, Heidelberg, Germany). 10 µL of polyplex particles prepared at a weight ratio of 100:1 PGSSuX 1-9 D:mRNA in 25 mM sodium acetate were added to cells cultured in a 96-well microplate containing 12,500 cells per well. Transfection of cells was monitored with a Cellink CELLCYTE X live cell imaging system over a period of 120 hours with images of cells taken once every hour in brightfield and a green filter channel to monitor transfection. Cells showed peak levels of transfection after 48 hours, as shown in FIG. 7, following addition of the PGS polyplex particles.

Example 22

Figure 8:
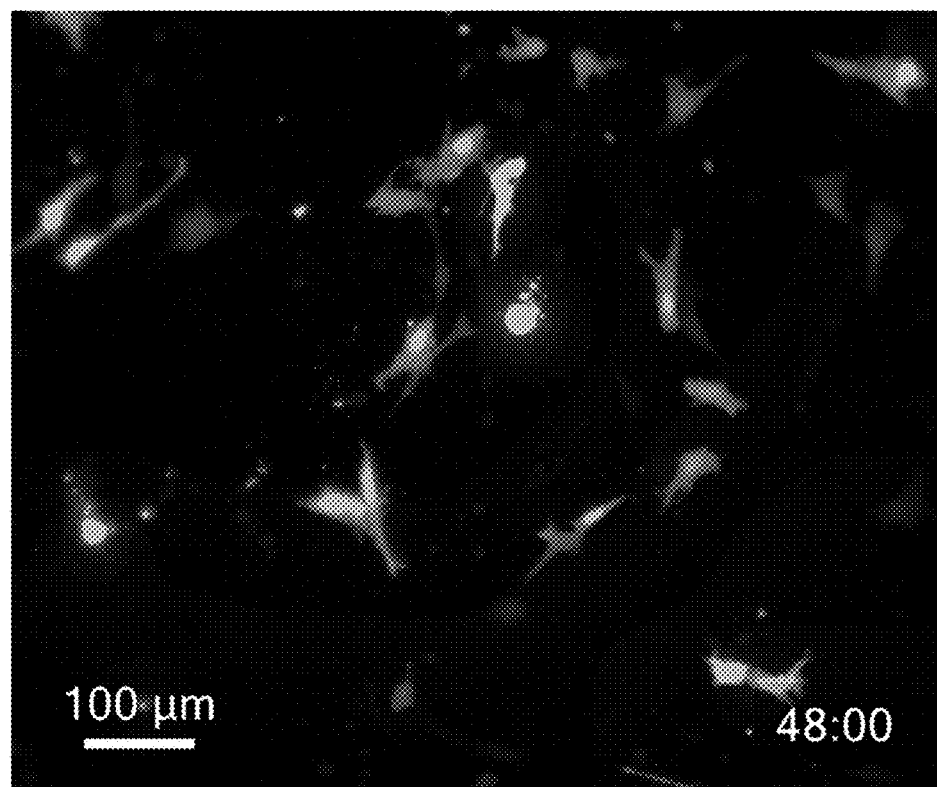
FIG. 8 shows an image obtained by a fluorescence microscope with successful transfection of mouse NIH/3T3 cells after 48 hours of exposure to polyplexes indicated by the lighter areas of the image.

Poly((glycerol sebacate$_{10\%}$ succinate$_{90\%}$)-co-xylitol dim-ethylaminopropylamine) (PGSSuX 1-9 D) of Example 2 was used to prepare polyplex particles with 140 pg of gWiz pDNA (Aldevron), having a size of 5757 base pairs, delivered per cell to express a GFP reporter in mouse NIH/3T3 cells (American Type Tissue Culture, Manassas, VA). 10 µL of polyplex particles prepared at a weight ratio of 100:3 PGSSuX 1-9 D:pDNA in 25 mM sodium acetate were added to cells cultured in a 96-well microplate containing 10,000 cells per well. Transfection of cells was monitored with a Cellink CELLCYTE X live cell imaging system over a period of 96 hours with images of cells taken once every hour during transfection in brightfield and a green filter channel to monitor transfection. Cells showed peak levels of transfection after 48 hours, as shown in FIG. 8, following addition of the PGS polyplex particles.

Example 23

Figure 9:
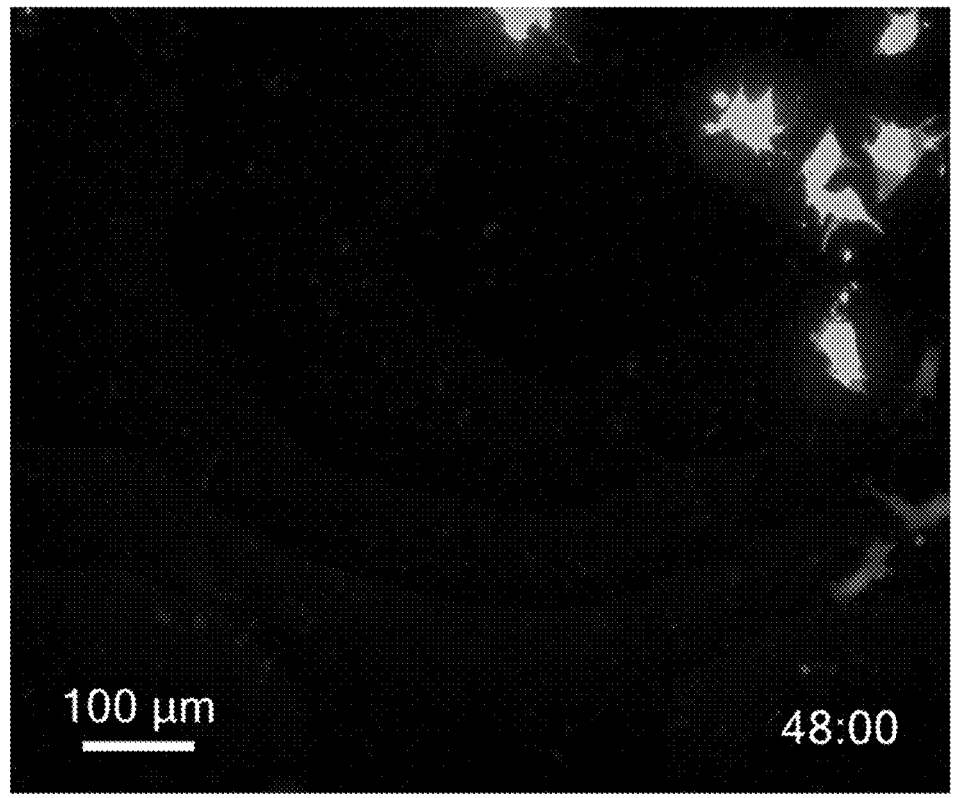
FIG. 9 shows an image obtained by a fluorescence microscope with successful transfection of mouse NIH/3T3 cells after 48 hours of exposure to polyplexes indicated by the lighter areas of the image.

Poly((glycerol sebacate$_{10\%}$ succinate$_{90\%}$)-co-xylitol dim-ethylaminopropylamine) (PGSSuX 1-9 D) of Example 2 was used to prepare polyplex particles with 60 pg of gWiz pDNA (Aldevron), having a size of 5757 base pairs, delivered per cell to express a GFP reporter in mouse NIH/3T3 cells (American Type Tissue Culture, Manassas, VA). 10 µL of polyplex particles prepared at a weight ratio of 50:2 PGSSuX 1-9 D:pDNA in 25 mM sodium acetate were added to cells cultured in a 96-well microplate containing 10,000 cells per well. Transfection of cells was monitored with a Cellink CELLCYTE X live cell imaging system over a period of 96 hours with images of cells taken once every hour during transfection in brightfield and a green filter channel to monitor transfection. Cells showed peak levels of transfection after 48 hours, as shown in FIG. 9, following addition of the PGS polyplex particles.

Example 24

Figure 10:
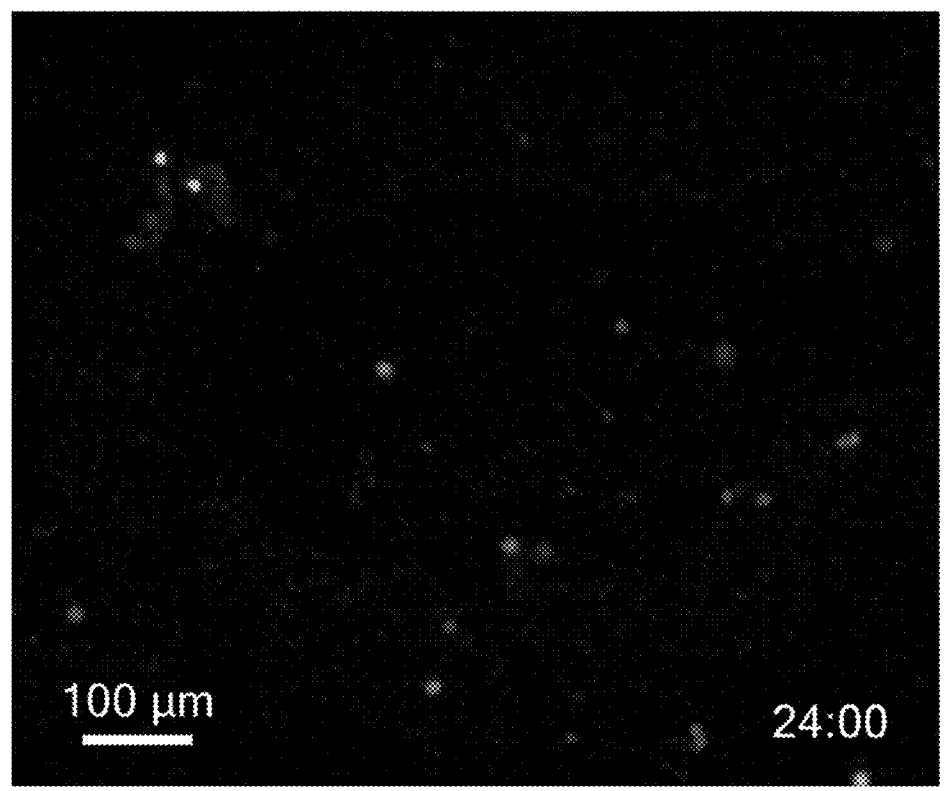
FIG. 10 shows an image obtained by a fluorescence microscope with successful transfection of Jurkat E6.1 cells after 24 hours of exposure to polyplexes indicated by the lighter areas of the image.

Poly((glycerol glutarate)-co-xylitol) (PGGXD) of Example 10 was used to prepare polyplex particles with 10 pg of gWiz pDNA (Aldevron), having a size of 5757 base pairs, delivered per cell to express a GFP reporter in a Jurkat E6.1 cell line (American Type Tissue Culture, Manassas, VA). 20 µL of polyplex particles prepared at a weight ratio of 25:1 PGGXD:pDNA in 25 mM sodium acetate were added to cells cultured in a 96-well microplate containing 250,000 cells per well. Transfection of cells was monitored with a Cellink CELLCYTE X live cell imaging system over a period of 48 hours with images of cells taken once every three hours during transfection in brightfield and a green filter channel to monitor transfection. Cells showed peak levels of transfection after 24 hours, as shown in FIG. 10, following addition of the PGS polyplex particles.

Example 25

Figure 11:
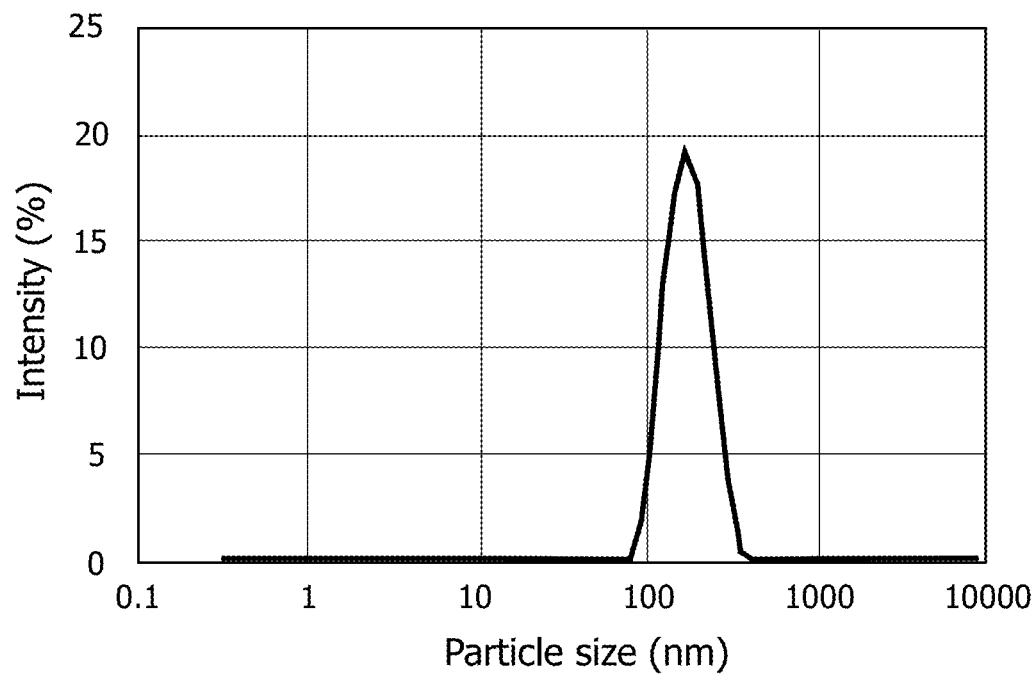
FIG. 11 shows the particle size distribution of 1:40 mRNA:charged polymer weight ratio polyplex particles in an embodiment of the present disclosure.
Figure 12:
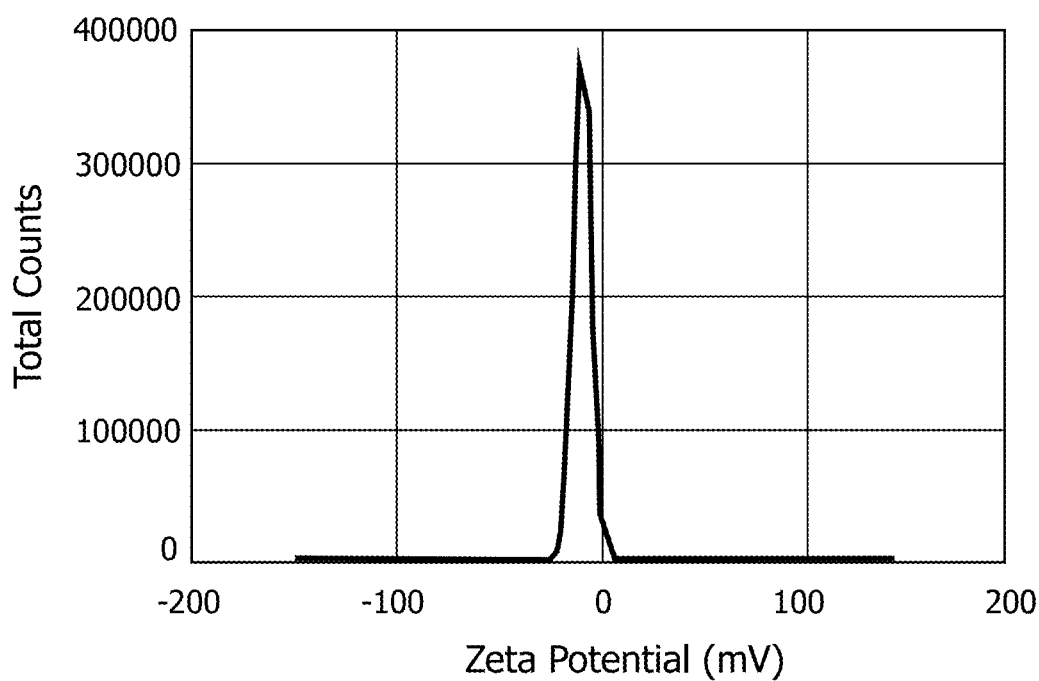
FIG. 12 shows the zeta potential of 1:40 mRNA:charged polymer weight ratio polyplex particles in an embodiment of the present disclosure.

Polyplex particles of Example 17 at an mRNA:charged polymer weight ratio of 1:40 were characterized on a Zetasizer Ultra (Malvern Panalytical Ltd., Malvern, UK)

light scattering system for their zeta potential and size. The results are shown in FIG. 11 and FIG. 12. The polyplex particles were found to have an average particle size of 167.3 nm with a polydispersity of 0.068 with a slightly negative zeta potential of −7.929 mV due to complexation of the charged polymer with mRNA.

Example 26

Figure 13:
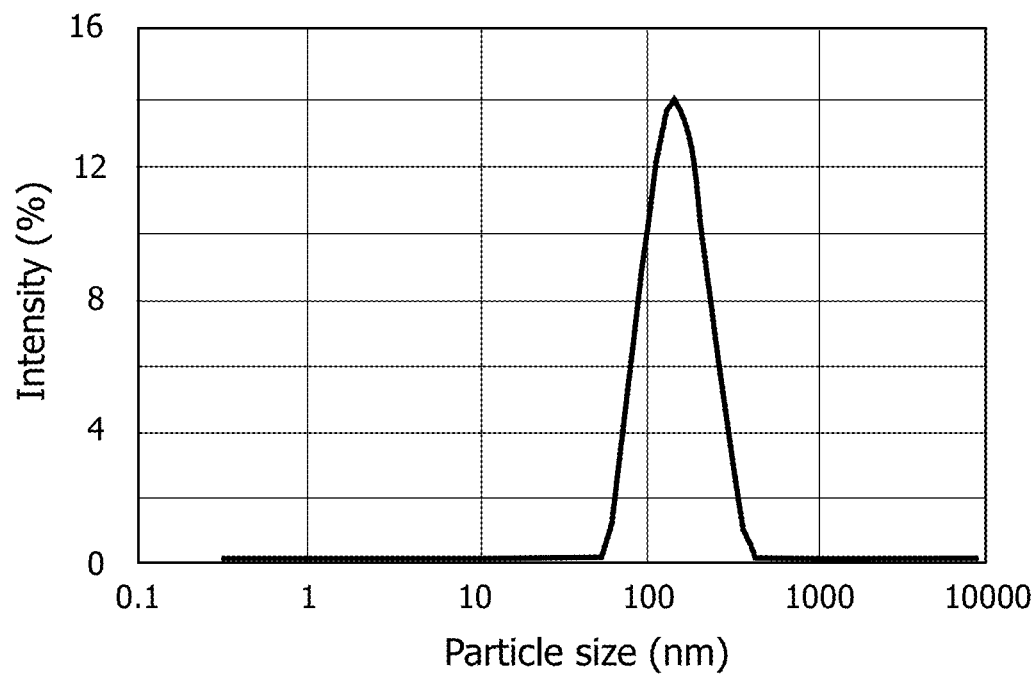
FIG. 13 shows the particle size distribution of 1:50 pDNA:charged polymer weight ratio polyplex particles in an embodiment of the present disclosure.
Figure 14:
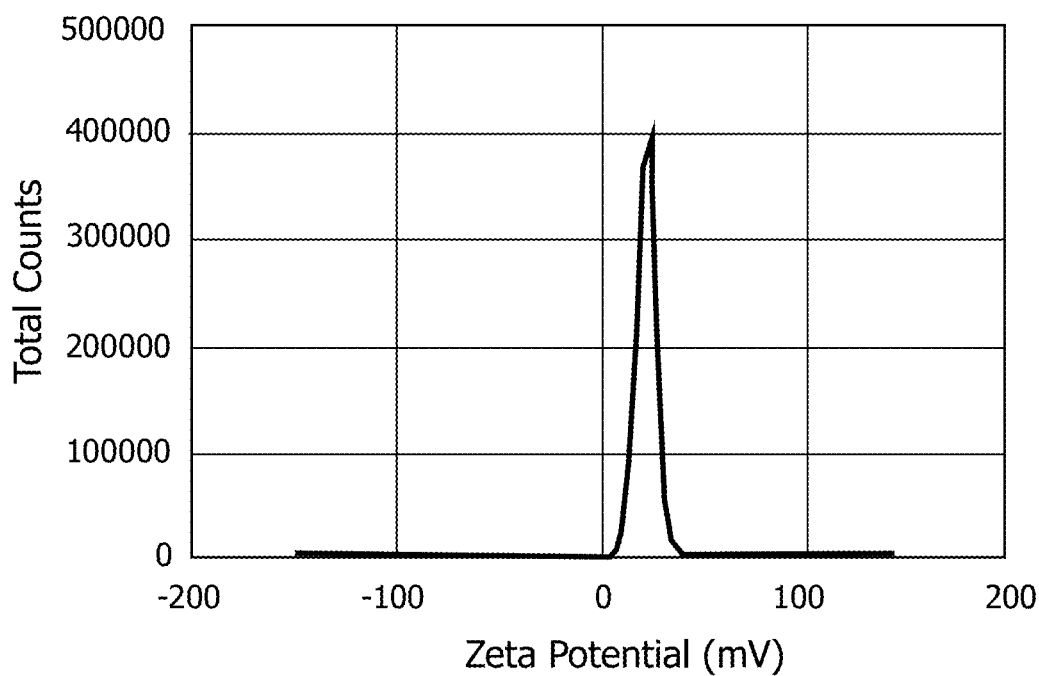
FIG. 14 shows the zeta potential of 1:50 pDNA:charged polymer weight ratio polyplex particles in an embodiment of the present disclosure.

Polyplex particles of Example 20 at an pDNA:charged polymer weight ratio of 1:50 were characterized on a Zetasizer Ultra (Malvern Panalytical Ltd., Malvern, UK) light scattering system for their zeta potential and size. The results are shown in FIG. 13 and FIG. 14. The polyplex particles were found to have an average particle size of 135 nm with a slightly positive zeta potential of 23.135 mV due to complexation of the charged polymer with pDNA.

Example 27

Glycerol (1.83 g) and succinic acid (2.34 g) in equal molar ratio were added to a 50-mL round bottom flask and heat to 130° C. with magnetic stirring. Once the mixture became homogeneous, dry lysine (2.9 g), in a 1:1 molar ratio to glycerol, was added slowly to the round bottom flask. Gas was released upon addition of lysine. Once off gassing ended more lysine was added. After all lysine was added, nitrogen flow was applied and the reaction was run for 12 hours. GPC results showed the resulting poly(lysine glycerol succinate) polymer having a weight average molecular weight of 3430 Da (Đ 5.09).

Example 28

Diglycidyl sebacate (0.5 g, 0.159 mmol), 4,7,10-trioxa-1,13-tridecanediamine (348 μL, 0.159 mmol), tributyl ammonium bromide (8 mg, 0.025 mmol), and dimethylformamide (DMF) (1 mL) were added to a round bottom flask with a magnetic stirrer. The mixture was then heated to 70° C. for 3 h. The reaction was then removed from the heat and cooled to room temperature, which resulted in a viscous liquid. Gel permeation chromatography (GPC) results show the resulting polymer with a weight average molecular weight of 1700 Da (Đ −1.8).

Example 29

A polyplex formulation, composed of 1 μg of the polymer of Example 27 mixed with 500 ng of a green fluorescent protein (GFP) reporter mRNA (DasherGFP mRNA, Aldevron, Fargo, ND), was added to a 24-well plate containing $1.0 \times 10^5$ fibroblasts. After 24 hours, cells were imaged on a fluorescence microscope to visualize transfected cells.

The polyplex particles were imaged under brightfield mode of a microscope. The cells were imaged under a fluorescence microscope and under a light microscope, with the fluorescence showing successfully transfected cells.

All above-mentioned references are hereby incorporated by reference herein.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims. In addition, all numerical values identified in the detailed description shall be interpreted as though the precise and approximate values are both expressly identified.

What is claimed is:

1. A polymeric delivery system comprising polyplexes comprising at least one charged polymer and at least one biologic, wherein the at least one charged polymer comprises a polyester copolymer of alternating monomers of a polyol monomer and a polycarboxylic acid monomer, wherein the polyol monomer comprises glycerol and wherein the polyester copolymer of alternating monomers of a polyol monomer and a polycarboxylic acid monomer has been modified by derivatization of at least a portion of free alcohols of the glycerol to incorporate at least one charged moiety having an opposite charge from a net charge of the at least one biologic, wherein the at least one charged moiety is selected from the group consisting of glutamine, lysine, arginine, sulfate, phosphate, sulfonate, sulfite, carboxy salt, ammonium, choline, phosphocholine, primary amine, secondary amine, tertiary amine, quaternary amine, and carboxylate.

2. The polymeric delivery system of claim 1, wherein the polyplexes have a number-weighted average particle size in the range of about 10 nm to about 1000 nm.

3. The polymeric delivery system of claim 1 further comprising a solvent.

4. The polymeric delivery system of claim 1, wherein the polycarboxylic acid monomer is selected from the group consisting of sebacic acid, succinic acid, and a combination thereof.

5. The polymeric delivery system of claim 1, wherein the at least one charged polymer and the at least one biologic are associated by ligand interaction or complex coordination.

6. The polymeric delivery system of claim 1, wherein the at least one biologic is selected from the group consisting of a nucleic acid, an amino acid, a peptide, a protein, a gene editing system, an antibody, and a cytokine.

7. The polymeric delivery system of claim 6, wherein the at least one biologic comprises a nucleic acid.

8. The polymeric delivery system of claim 1, wherein the at least one charged polymer is non-immunogenic.

9. The polymeric delivery system of claim 1 further comprising an additive selected from the group consisting of a salt, a buffer, a surfactant, a stabilizing agent, and a combination thereof, wherein the additive tunes at least one property of the polyplexes.

10. A process of forming a polymeric delivery system comprising polyplexes, the process comprising combining charged polymers and biologics in a solvent to associate the charged polymers and the biologics as the polyplexes, the polyplexes comprising at least one of the charged polymers and at least one of the biologics, wherein the polyol monomer comprises glycerol and wherein each of the charged polymers comprises a polyester copolymer of alternating monomers of a polyol monomer and a polycarboxylic acid monomer, wherein the polyester copolymer of alternating monomers of a polyol monomer and a polycarboxylic acid monomer has been modified by derivatization of at least a portion of free alcohols of the glycerol to incorporate at least one charged moiety having an opposite charge from a net charge of the biologics, wherein the at least one charged moiety is selected from the group consisting of glutamine, lysine, arginine, sulfate, phosphate, sulfonate, sulfite, carboxy salt, ammonium, choline, phosphocholine, primary amine, secondary amine, tertiary amine, quaternary amine, and carboxylate.

11. The process of claim 10, wherein the polyplexes have a number-weighted average particle size in the range of about 10 nm to about 1000 nm.

12. The process of claim 10, wherein the polycarboxylic acid monomer is selected from the group consisting of sebacic acid, succinic acid, and a combination thereof.

13. The process of claim 10 further comprising modifying the polyester copolymer of alternating monomers of a polyol monomer and a polycarboxylic acid monomer with the at least one charged moiety to form the charged polymers.

14. The process of claim 10, wherein the biologics are selected from the group consisting of a nucleic acid, an amino acid, a peptide, a protein, a gene editing system, an antibody, and a cytokine.

15. The process of claim 14, wherein the biologics comprise a nucleic acid.

16. The process of claim 10 further comprising adding at least one additive to the polymeric delivery system, wherein the additive is selected from the group consisting of a salt, a buffer, a surfactant, a stabilizing agent, and a combination thereof.

17. A process of delivering a biologic to cells, the process comprising administering polyplexes of the biologic associated with a charged polymer, the charged polymer comprising a polyester copolymer of alternating monomers of a polyol monomer and a polycarboxylic acid monomer, wherein the polyol monomer comprises glycerol and wherein the polyester copolymer of alternating monomers of a polyol monomer and a polycarboxylic acid monomer has been modified by derivatization of at least a portion of free alcohols of the glycerol to incorporate at least one charged moiety having an opposite charge from a net charge of the biologic, wherein the at least one charged moiety is selected from the group consisting of glutamine, lysine, arginine, sulfate, phosphate, sulfonate, sulfite, carboxy salt, ammonium, choline, phosphocholine, primary amine, secondary amine, tertiary amine, quaternary amine, and carboxylate.

18. The process of claim 17, wherein the polyplexes have a number-weighted average particle size in the range of about 10 nm to about 1000 nm.

19. The process of claim 17, wherein the administering comprises administering to the cells ex vivo.

20. The process of claim 17, wherein the administering comprises administering to the cells in vitro.

21. The process of claim 17, wherein the administering comprises administering to the cells in vivo.

22. The process of claim 17 further comprising combining the charged polymer and the biologic to form the polyplexes.

23. The process of claim 17, wherein the polycarboxylic acid monomer is selected from the group consisting of sebacic acid, succinic acid, and a combination thereof.

24. The process of claim 17, wherein the biologic is selected from the group consisting of a nucleic acid, an amino acid, a peptide, a protein, a gene editing system, an antibody, and a cytokine.

25. The process of claim 24, wherein the biologic comprises a nucleic acid.

* * * * *